(12) United States Patent
Geibel, Jr.

(10) Patent No.: US 9,011,746 B2
(45) Date of Patent: Apr. 21, 2015

(54) MOLD AND METHOD FOR MOLDING PARTS REQUIRING MULTIPLE MOLD INPUTS

(75) Inventor: Martel B. Geibel, Jr., Pomona, CA (US)

(73) Assignee: Caco Pacific Corporation, West Covina, CA (US)

( * ) Notice: Subject to any disclaimer, the term of this patent is extended or adjusted under 35 U.S.C. 154(b) by 335 days.

(21) Appl. No.: 13/367,668

(22) Filed: Feb. 7, 2012

(65) Prior Publication Data

US 2013/0200547 A1 Aug. 8, 2013

(51) Int. Cl.
 *B29C 45/14* (2006.01)
 *B29C 45/00* (2006.01)
 *B29C 45/16* (2006.01)
 B29L 31/56 (2006.01)

(52) U.S. Cl.
 CPC .............. *B29C 45/006* (2013.01); *B29C 45/162* (2013.01); *B29L 2031/56* (2013.01)

(58) Field of Classification Search
 CPC .............. B29C 45/1615; B29C 45/162; B29C 45/1635
 USPC ....................................... 264/255, 294, 328.7
 See application file for complete search history.

(56) References Cited

U.S. PATENT DOCUMENTS

| | | |
|---|---|---|
| 3,792,946 A | 2/1974 | Zavasnik |
| 3,982,869 A | 9/1976 | Eggers |
| 4,379,685 A | 4/1983 | Tada et al. |
| 4,402,657 A | 9/1983 | Laghi et al. |
| 4,462,783 A | 7/1984 | Hehl |
| 4,550,006 A | 10/1985 | Laghi et al. |
| 4,698,001 A | 10/1987 | Vismara et al. |
| 5,318,435 A | 6/1994 | Brown |
| 6,019,929 A | 2/2000 | Noggle |
| 6,372,170 B1 | 4/2002 | Nishida et al. |
| 6,398,537 B2 | 6/2002 | Matysek |
| 6,719,551 B2 | 4/2004 | Polk, Jr. |
| 7,144,537 B2 | 12/2006 | Tustin et al. |
| 7,604,764 B2 | 10/2009 | Arai et al. |
| 2003/0001311 A1 | 1/2003 | Collette |
| 2003/0116886 A1 | 6/2003 | Nakazawa |
| 2004/0084809 A1 | 5/2004 | Vanderploeg et al. |
| 2004/0124558 A1 | 7/2004 | Gram |
| 2004/0212126 A1 | 10/2004 | Tustin |
| 2008/0079192 A1 | 4/2008 | Nishida |
| 2009/0256282 A1* | 10/2009 | Olaru et al. ................. 264/328.8 |

(Continued)

OTHER PUBLICATIONS

International search report for PCT/US2010/042908 dated Jan. 3, 2013. (9 pages).

(Continued)

*Primary Examiner* — James Sanders
(74) *Attorney, Agent, or Firm* — Leech Tishman Fuscaldo & Lampl

(57) ABSTRACT

The invention is a method for preparing a finished part in a mold wherein the finished part includes n mold inputs, the method comprising the steps of (a) providing a mold having n mold stations, (b) simultaneously adding a mold input at each mold station to create a finished part and n−1 part portions, (c) removing the finished part and each part portion from each mold station, (d) transferring the finished part to a finished part holding area and transferring each part portion to a different mold station, and (e) repeating steps (b) through (d).

3 Claims, 31 Drawing Sheets

(56) References Cited

U.S. PATENT DOCUMENTS

2010/0276836 A1* 11/2010 Armbruster et al. .......... 264/255
2011/0165424 A1* 7/2011 Mortazavi ..................... 428/426

OTHER PUBLICATIONS

"International Preliminary Report on Patentability" mailed on May 23, 2014 in International Application No. PCT/US2012/042908.

* cited by examiner

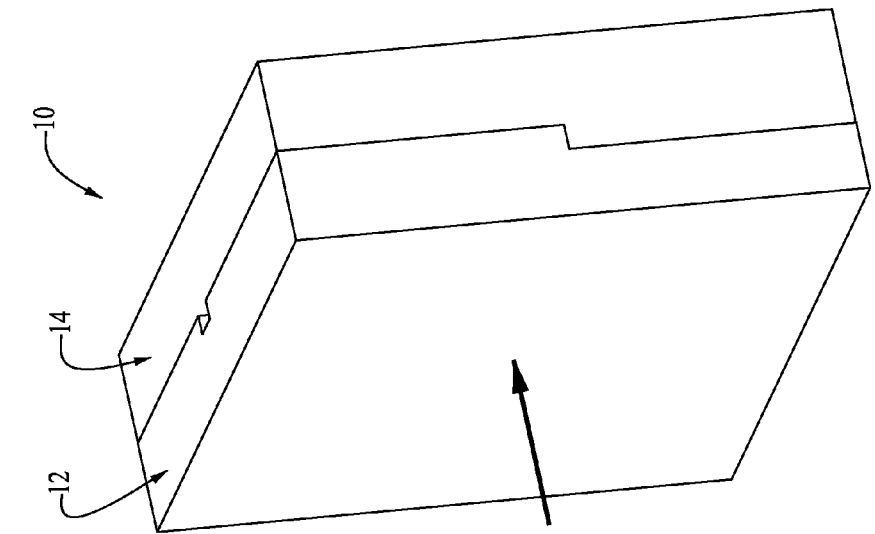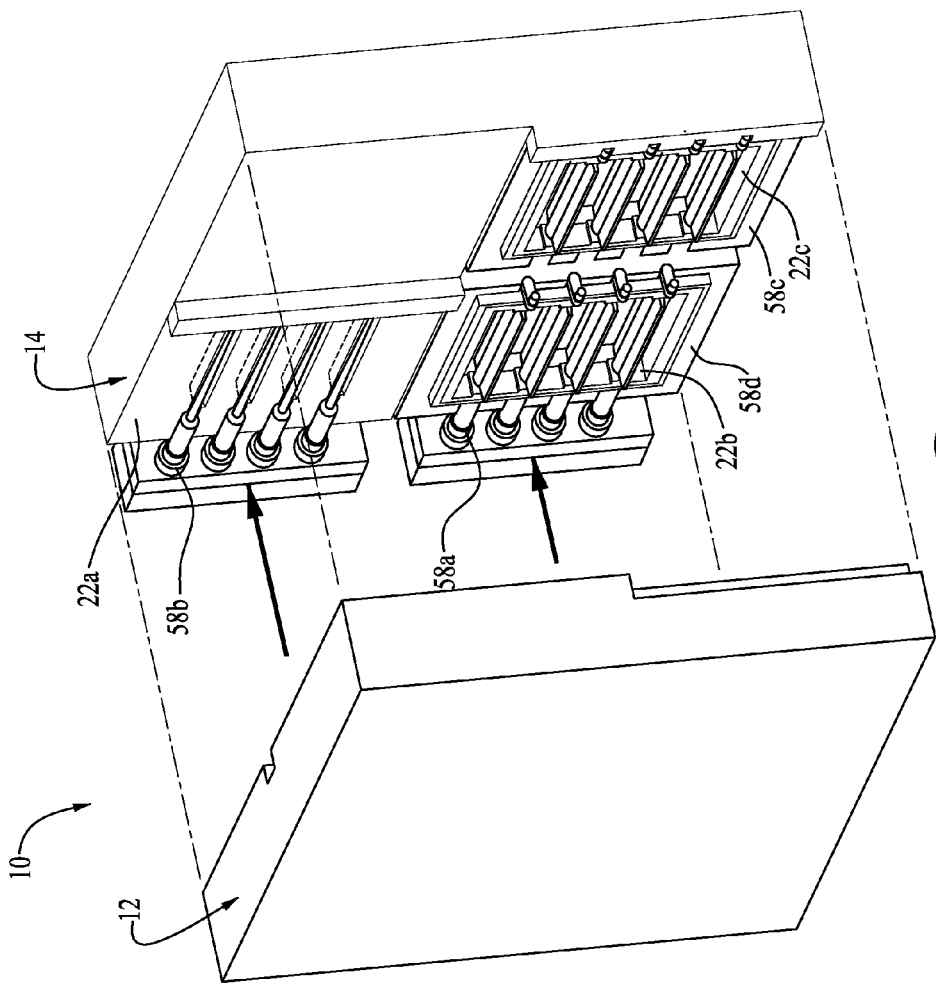

MOLD AND METHOD FOR MOLDING PARTS REQUIRING MULTIPLE MOLD INPUTS

FIELD OF THE INVENTION

This invention relates generally to molds and molding methods and, more specifically, to molds and molding methods for manufacturing plastic parts requiring multiple mold input.

BACKGROUND OF THE INVENTION

Plastic injection molding equipment, including plastic injection machines and molds, have been popular for many decades for manufacturing simple plastic devices.

In recent years, various complex injection molding systems have been proposed to manufacture more complex plastic devices, including devices having multiple materials, devices requiring various markings and devices assembled from a variety of individual components.

Most of the injection molding systems of the prior art are very complex, require a great deal of space, frequently require multiple plastic injection machines, multiple molds and frequently require robot-like devices to move components between the several different molds.

Another problem with complex molding systems of the prior art is that such systems are inefficient, in that they comprise molding stations which are frequently inactive during the manufacturing process.

Accordingly, there is a need for a mold capable of manufacturing complex plastic devices which avoid the aforementioned problems in the prior art.

SUMMARY OF THE INVENTION

The invention satisfies this need. The invention is a method for preparing a finished part in a mold wherein the finished part includes n mold inputs, the method comprising the steps of (a) providing a mold having n mold stations, (b) simultaneously adding a mold input at each mold station to create a finished part and n−1 part portions, (c) removing the finished part and each part portion from each mold station, (d) transferring the finished part to a finished part holding area and transferring each part portion to a different mold station, and (e) repeating steps (b) through (d).

The invention is also a mold capable of carrying out the method of the invention. Such mold comprises (a) one or more core sides, each core side having a plurality of core side mold station portions; (b) one or more cavity sides, each cavity side having a plurality of cavity side mold station portions, the one or more core side mold station portions or the one or more cavity side mold station portions or both the one or more core side mold station portions and the one or the one or more cavity side mold station portions being movable between (i) a closed mold position wherein the core side mold station portions are disposed proximate to the cavity side mold station portions, and (ii) an open mold position wherein the core side mold station portions are spaced apart from the cavity side mold station portions, each cavity side mold station portion being aligned with a core side mold station portion such that, in the closed mold position each cavity side mold station portion mates with a core side mold station portion to form a mold station capable of adding a mold input to a part portion disposed within the mold station; and (c) one or more transfer mechanisms for transferring the finished part from a mold station to a finished part holding area and for transferring each part portion from a mold station to a different mold station, such that, when in the closed mold position, mold inputs can be simultaneously added at each mold station to a part portion disposed within that mold station.

DRAWINGS

These and other features, aspects and advantages of the present invention will become better understood with reference to the following description, appended claims and accompanying drawings where:

FIGS. 25-33 illustrate a sequence of steps for the preparation of the part illustrated in FIG. 22 by a third embodiment of a method having features of the invention.

DETAILED DESCRIPTION OF THE INVENTION

Figure 1:
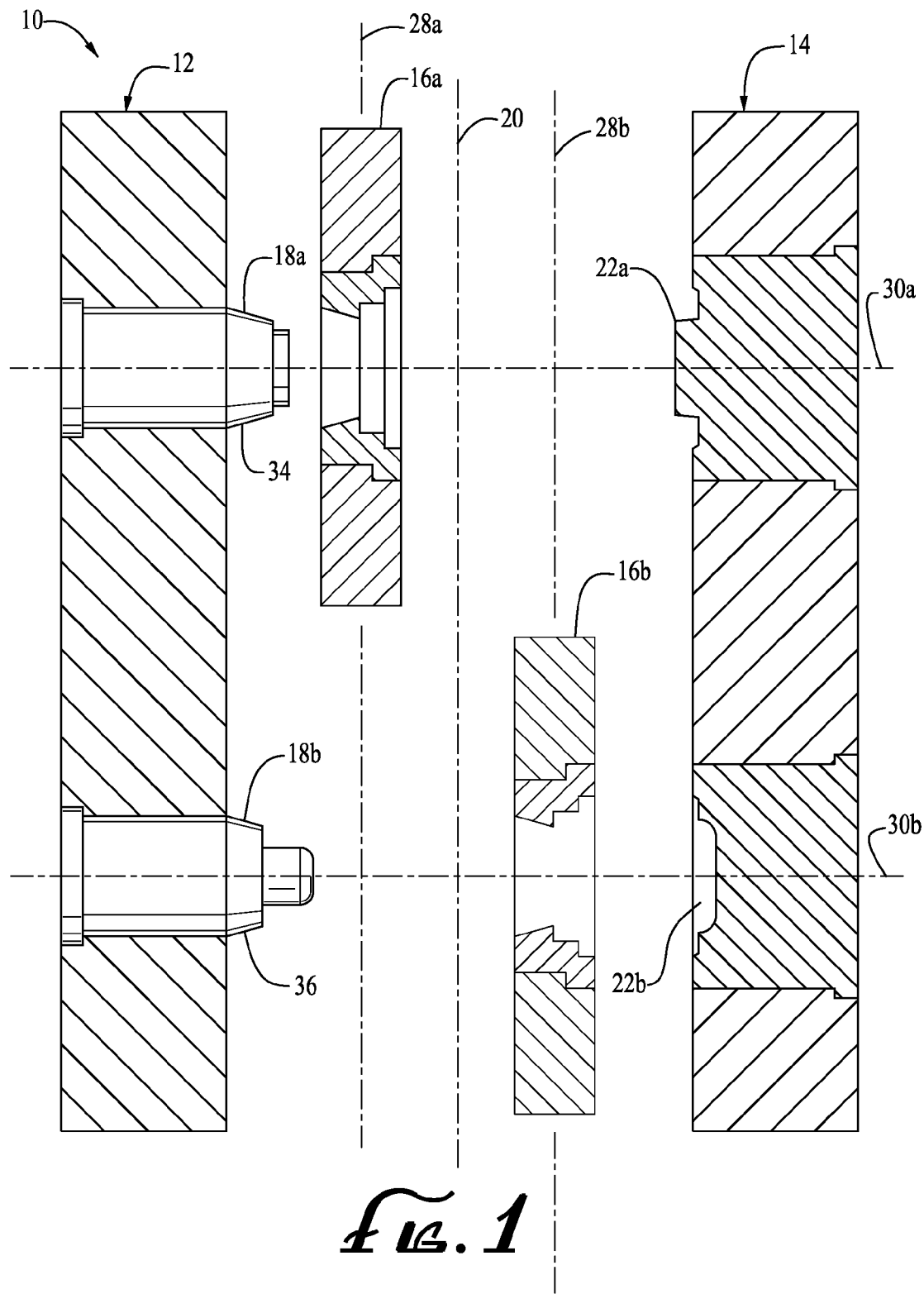
FIGS. 1-9 illustrate a sequence of steps for the preparation of a part by a first embodiment of a method having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a method for preparing a finished part in a mold, wherein the finished part includes n mold inputs. The invention is also a mold capable of carrying out the method of the invention.

The method of the invention comprises the steps of (a) providing a mold having n mold stations, (b) simultaneously adding a mold input at each mold station to create a finished part and n−1 part portions, (c) removing the finished part and each part portion from each mold station, (d) transferring the finished part to a finished part holding area and transferring each part portion to a different mold station, and (e) repeating steps (b) through (d).

In the method of the invention, the step of transferring the finished part to a finished part holding area and transferring each part portion to a different mold station is accomplished such that, during steps (b)-(e) each part portion is transferred between different mold stations along paths disposed in more than one plane.

The invention is also a mold 10 capable of carrying out the above-described method of the invention. The mold 10 of the invention comprises one or more core sides 12, one or more cavity sides 14 and one or more transfer mechanisms 16. Several embodiments of the mold 10 of the invention are illustrated in the drawings.

Each of the one or more core sides 12 has a plurality of core side mold station portions 18. Each of the one or more cavity sides 14 has a plurality of cavity side mold station portions 22.

The mold 10 is configured to alternatively assume (i) a closed mold position wherein the core side mold station portions 18 are disposed proximate to the cavity side mold station portions 22 and (ii) an open mold position wherein the core side mold station portions 18 are spaced apart from the cavity side mold station portions 22. In the closed mold position, the one or more core sides 12 and the one or more cavity sides 14 are both disposed proximate to a central plane 20.

The mold 10 can alternatively assume the closed mold position and the open mold position by making the one or more core sides 12 movable with respect to the one or more cavity sides 14, by making the one or more cavity sides 14 movable with respect to the one or more core sides 12 or by making both the one or more cavity sides 14 and the one or more core sides 12 movable with respect to one another. Typically, the hot side of the mold (most often the one or more cavity sides 14) is stationary, while the cold side (most usually the one or more core sides) 12 is movable between the closed mold position and the open mold position. In the embodiments illustrated in the drawings, however, both the one or more cavity sides 14 and the one or more core sides 12 are movable with respect to one another.

Each cavity side mold station portion 22 is aligned with a core side mold station portion 18 such that, in the closed mold position, each cavity side mold station portion 22 mates with a core side mold station portion 18 to form a mold station 24 capable of adding a mold input to a part portion 26 disposed within that mold station 24. As used in this application, the term "mold input" is meant to mean a necessary step in the molding process. Mold inputs include, but are not limited to, material additions, marking, labeling, inserting and cooling.

The one or more transfer mechanisms 16 are capable of transferring a finished part 32 from a mold station 24 to a finished part holding area 42 and for transferring each part portion 26 from a mold station 24 to a different mold station 24, such that, when the mold 10 is in the closed mold position, mold inputs can be simultaneously added at each mold station 24 to a part portion 26 disposed within that mold station 24.

The one or more transfer mechanisms 16 typically travel along linear paths. Most typically, the one or more transfer mechanisms 16 travel along linear paths in parallel transfer mechanism planes 28 disposed parallel to the central plane 20 or in perpendicular transfer mechanism planes 30 disposed perpendicular to the central plane 20, but the one or more transfer mechanisms 16 can travel along other linear paths as well.

The one or more transfer mechanisms 16 can also be rotatable about an axis normal to the central plane 20. Typically, the one or more transfer mechanisms 16 comprise at least two transfer mechanisms 16 which move in linear paths parallel to one another.

The transfer mechanisms 16 can also comprise one or more stripper plates adapted for removing part portions 26 from a particular mold station 24, as well as for transporting part portions 26 between the mold stations 24.

FIGS. 1-9 illustrate a sequence of steps in one embodiment of the method of the invention. FIG. 1 illustrates a mold 10 of the invention prior to commencement of the method of the invention for creating part 32. Part 32 in this embodiment comprises part portion 26 to which is co-molded a second material 40. The sequence of steps in this embodiment requires the mold 10 having a core side 12, a cavity side 14, a first transfer mechanism 16a and a second transfer mechanism 16b. The core side 12 comprises a first core side mold station portion 18a and a second core side mold station portion 18b. The first core side mold portion 18a comprises a first mandrel 34 and the second core side mold station portion 18b comprises a second mandrel 36. The cavity side 14 comprises a first cavity side mold station portion 22a and a second cavity side mold station portion 22b. The first core side mold station portion 18a is aligned with the first cavity side mold station portion 22a, and the second core side mold station portion 18b is aligned with the second cavity side mold station portion 22b. The core side 12 and the cavity side 14 are disposed on opposite sides of a central plane 20.

In the mold 10 illustrated in FIG. 1, the first transfer mechanism 16a is adapted to move in a first transfer mechanism parallel plane 28a disposed with the central plane 20, and the second transfer mechanism 16b is adapted to move in a second parallel transfer mechanism plane 28b, also disposed parallel to the central plane 20. Both the first transfer mechanism 16a and the second transfer mechanism 16b are also adapted to move in a first perpendicular transfer mechanism plane 30a and a second perpendicular transfer mechanism plane 30b, both disposed perpendicular to the central plane 20.

Figure 2:
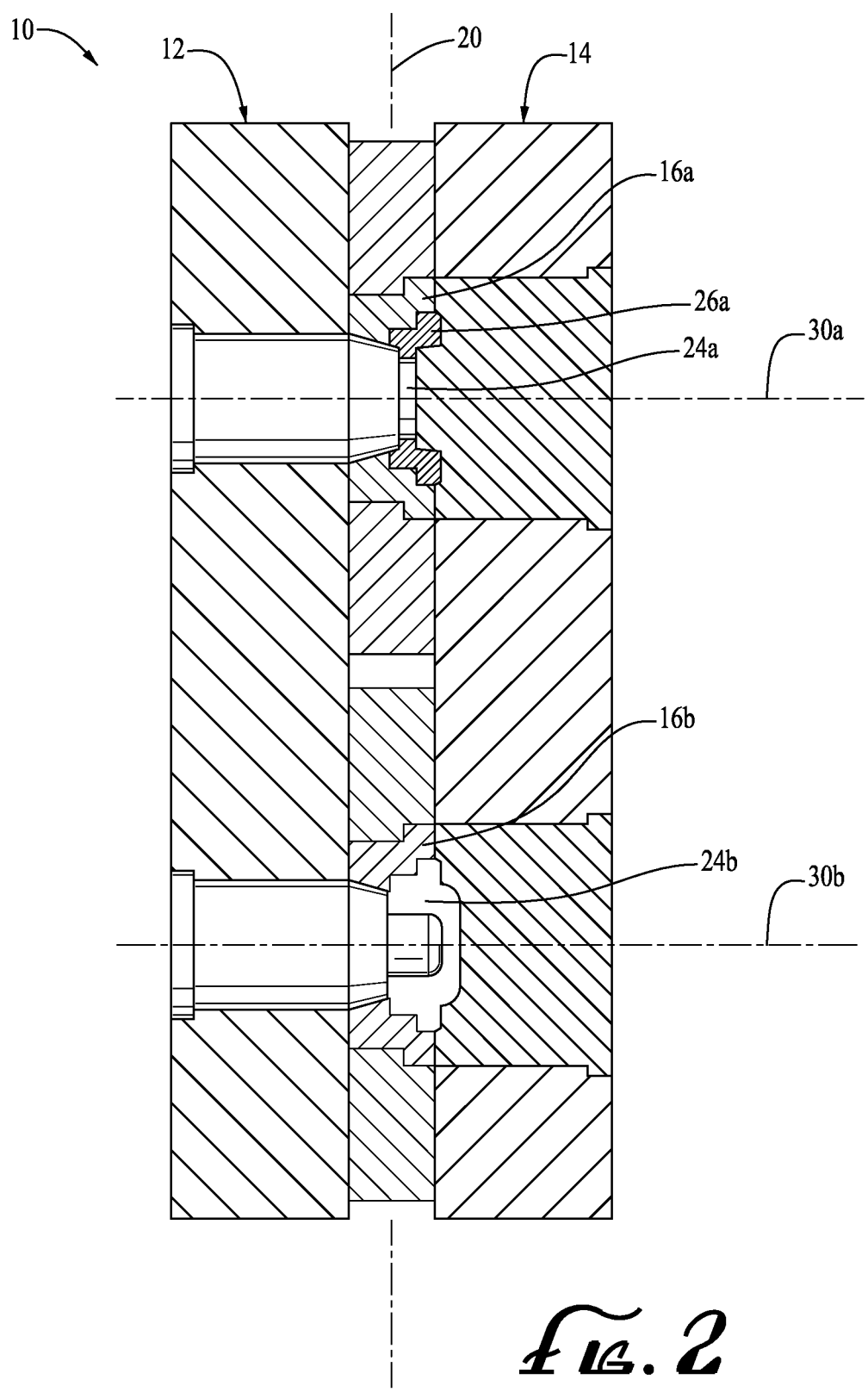

FIG. 2 illustrates the initial step in the sequence, wherein the mold 10 is in the closed mold position. In this configuration, the first core side mold station portion 18a is mated with the first cavity side mold station portion 22a to form a first mold station 24a. The first transfer mechanism 16a has moved laterally along the first perpendicular transfer mechanism plane 30a, and is disposed at the first mold station 24a. Also in this configuration, the second core side mold station portion 18b is mated with the second cavity side mold station portion 22b to form a second mold station 24b. The second transfer mechanism 16b has moved laterally along the second perpendicular transfer mechanism plane 30b, and is now disposed at the second mold station 24b. In the first mold station 24a, a first material is shown to be injected from the first cavity side mold station portion 22a and into the first mold station 24a to create an initially-formed first part portion 26a within the first mold station 24a.

Figure 3:
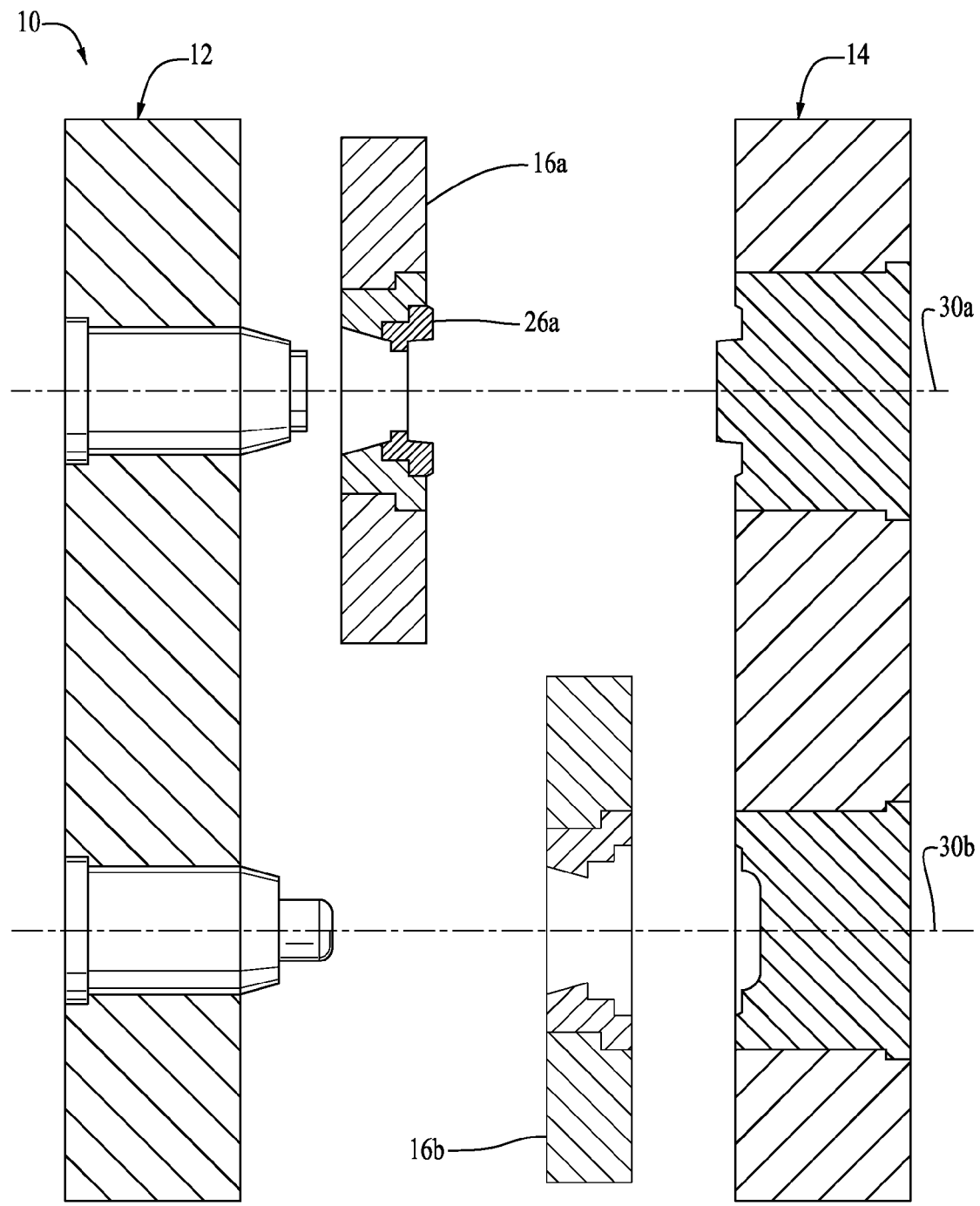

FIG. 3 illustrates the next step in the sequence, wherein the mold 10 is disposed again in the open mold position. The first transfer mechanism 16a and the second transfer mechanism 16b have moved along the first perpendicular and second perpendicular transfer mechanism planes 30a and 30b, respectively, to be spaced apart from the core side 12 and from the cavity side 14. The initially-formed first part portion 26a is shown attached to the first transfer mechanism 16a.

Figure 4:
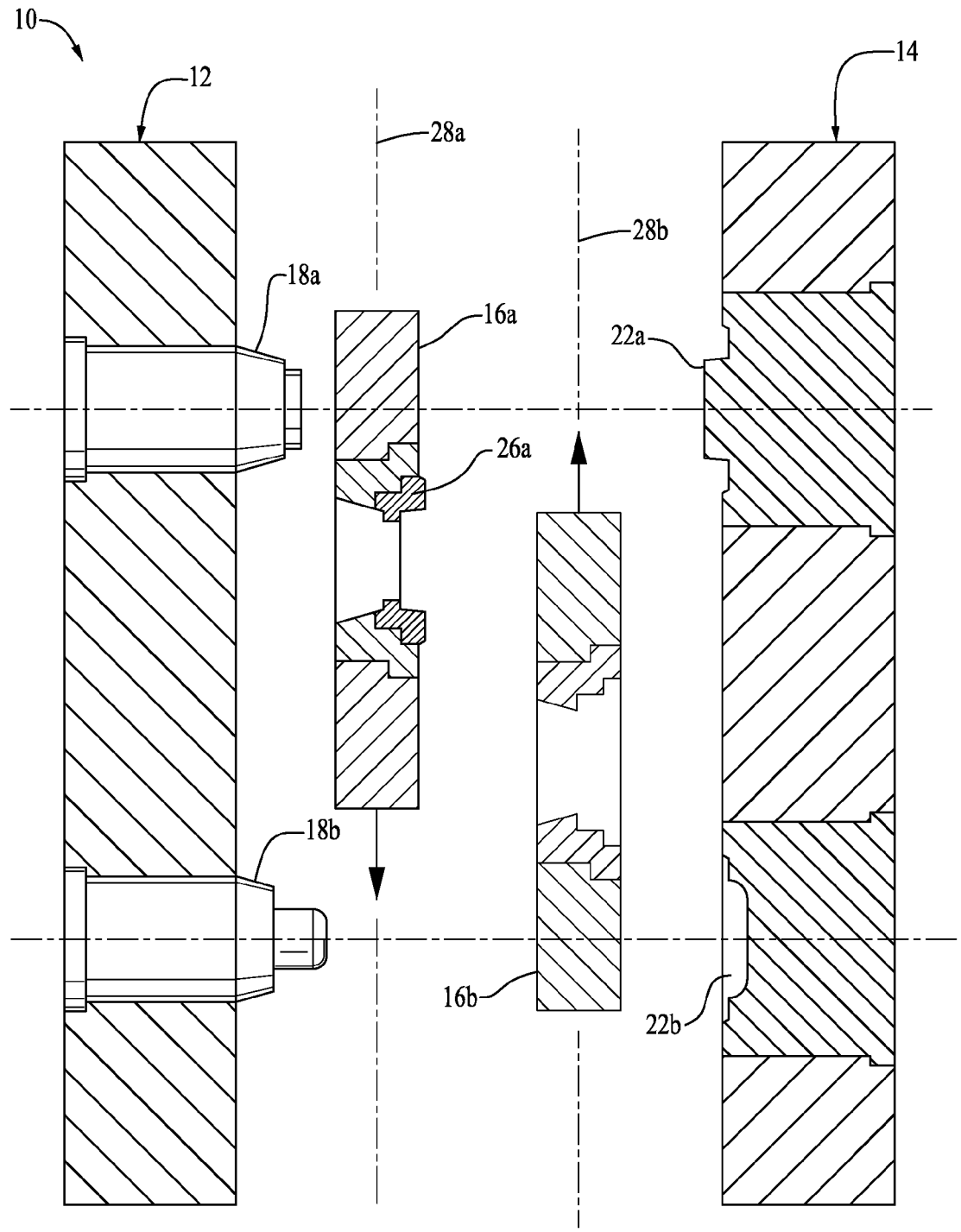

FIG. 4 illustrates the next step in the sequence, wherein the first transfer mechanism 16a travels within the first parallel transfer mechanism plane 28a from its position opposite the first core side mold station portion 18a towards a position opposite the second core side mold station portion 18b. FIG. 4 also illustrates the second transfer mechanism 16b traveling within the second parallel transfer mechanism plane 28b from its position opposite the second cavity side mold station portion 22b towards a position opposite the first cavity side mold station portion 22a.

Figure 5:
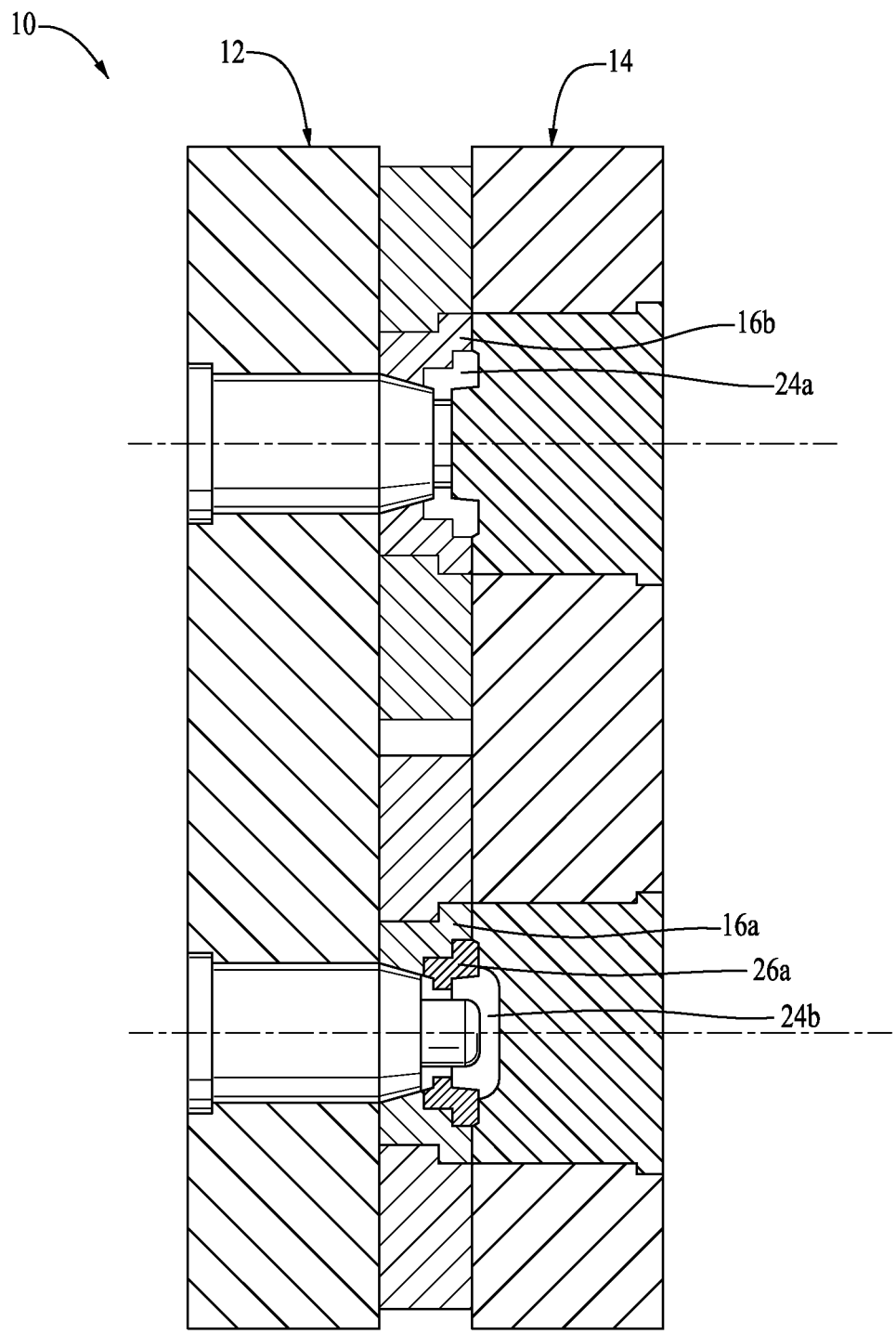

FIG. 5 illustrates the next step in the sequence, wherein the mold 10 is again disposed in the closed mold position. The first transfer mechanism 16a and the initially-formed part portion 26a are disposed at the second mold station 24b, and the (empty) second transfer mechanism 16b is disposed at the first mold station 24a.

Figure 6:
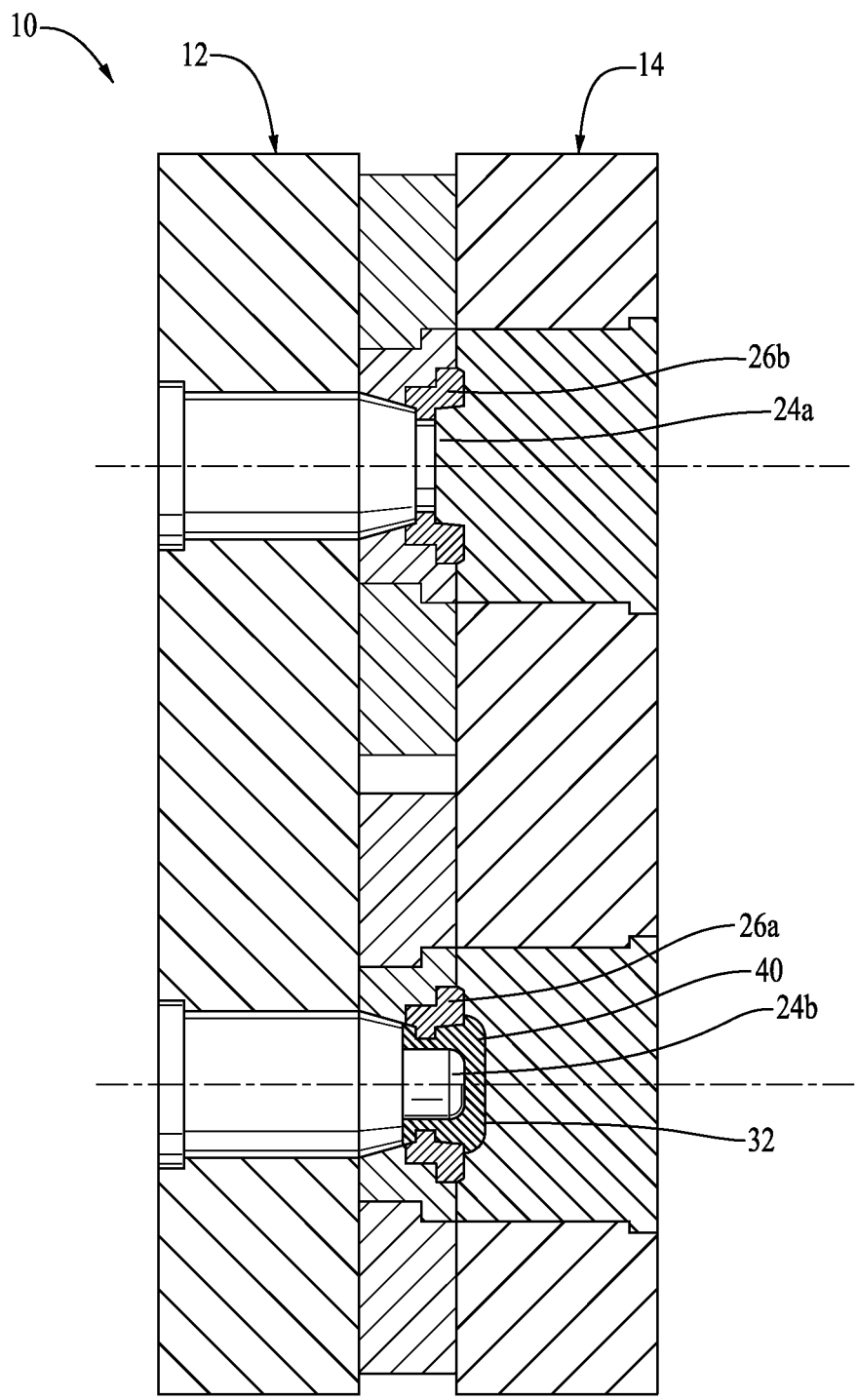

FIG. 6 illustrates the next step in the sequence, wherein the first material from the first cavity side mold station portion 22a is again injected into the first mold station 24a to create a second-formed first part portion 26b, and a second material

40 is injected from the cavity side second mold station portion 22b into the second mold station 24b. The injection of the second material 40 into the second mold station 24b co-molds with the initially-formed first part portion 26a to form the two-component finished part 32.

Figure 7:
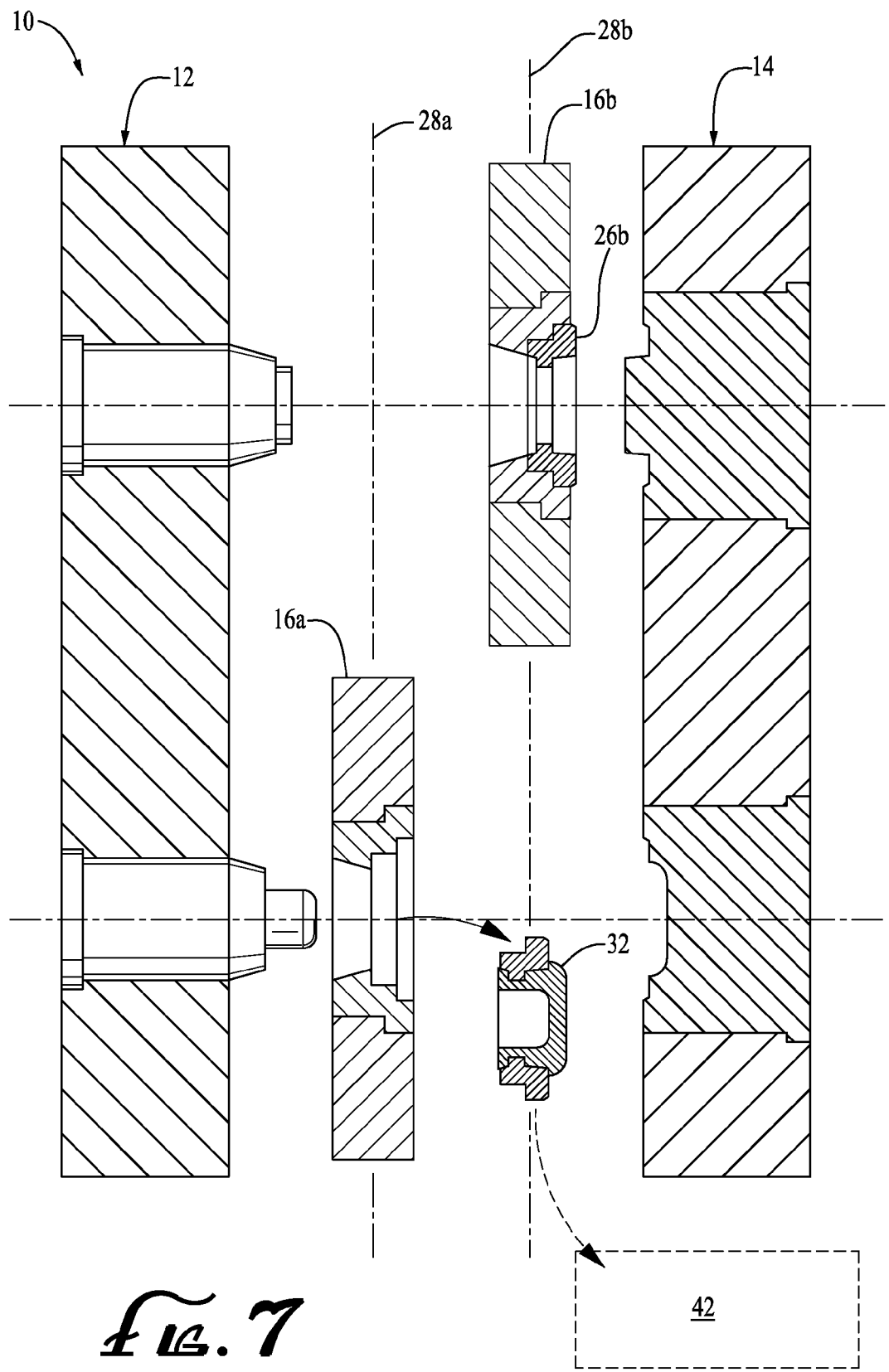

FIG. 7 illustrates the next step in the sequence, wherein the mold 10 is again disposed in the open mold position. At this juncture in the method, the finished part 32 is removed from the first transfer mechanism 16a and transferred to a finished part holding area 42. The second transfer mechanism 16b, retaining the second-formed first part portion 26b, is disposed within the second parallel transfer mechanism plane 28b.

Figure 8:
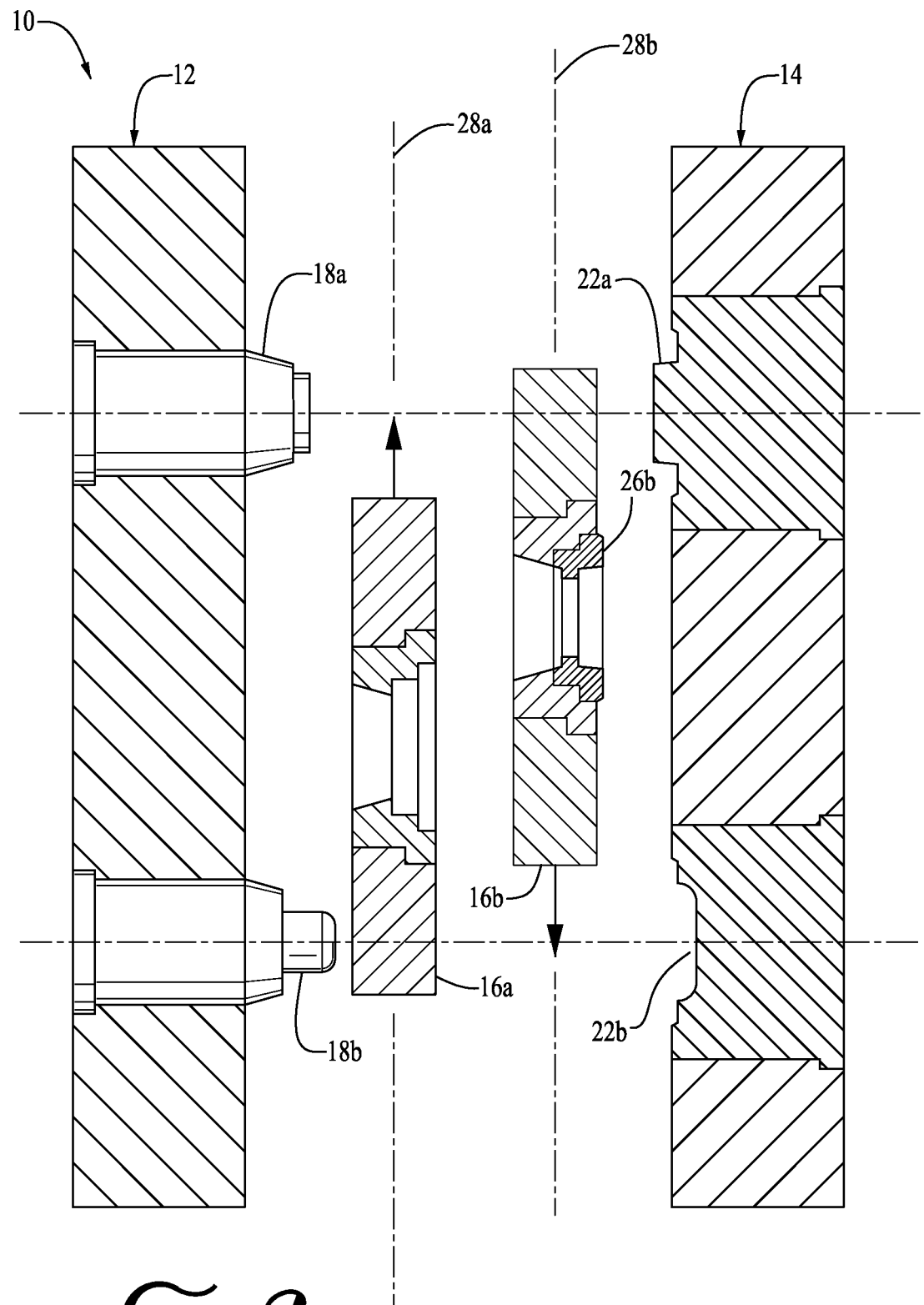
Figure 9:
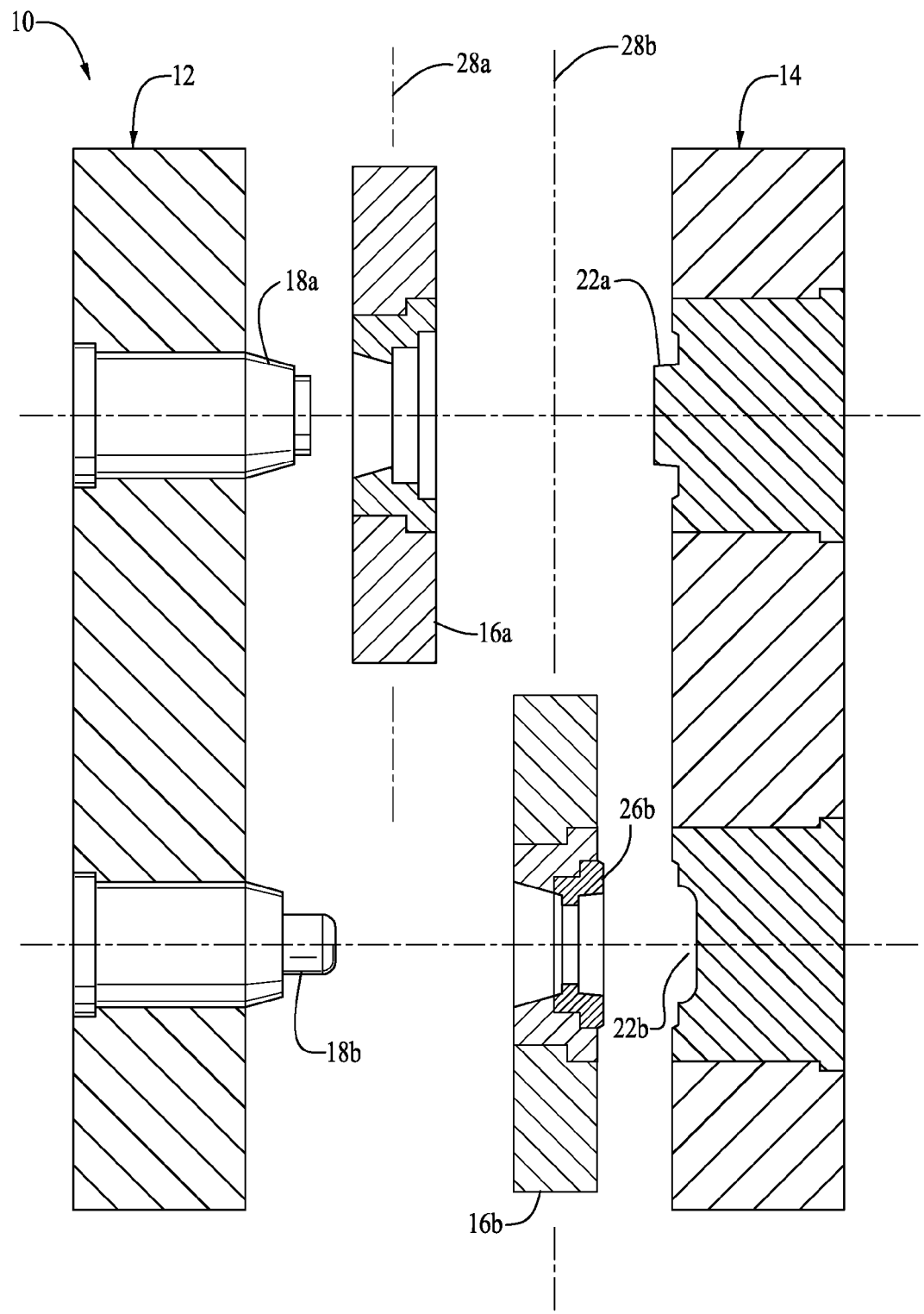

FIGS. 8 and 9 illustrate the last step in the sequence, wherein the empty first transfer mechanism 16a moves within the first parallel transfer mechanism plane 28a back to a position opposite the first core side mold station portion 18a, while the second transfer mechanism 16b, bearing the second-formed first part portion 26b, moves along the second parallel transfer mechanism plane 28b to a position opposite the second core side mold station portion 18b.

Thereafter, the process continues in repeated iterations of the steps illustrated in FIGS. 5-9. It will be observed that, once the method of the invention is underway, no mold station 24 sits idle at any stage of the method.

Figure 10:
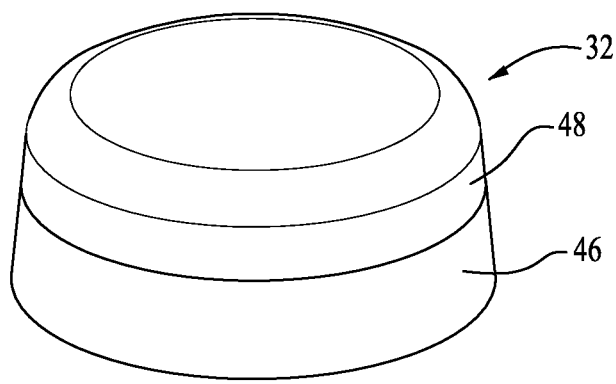
FIG. 10 is a perspective of a part which is formed by the invention.
Figure 11:
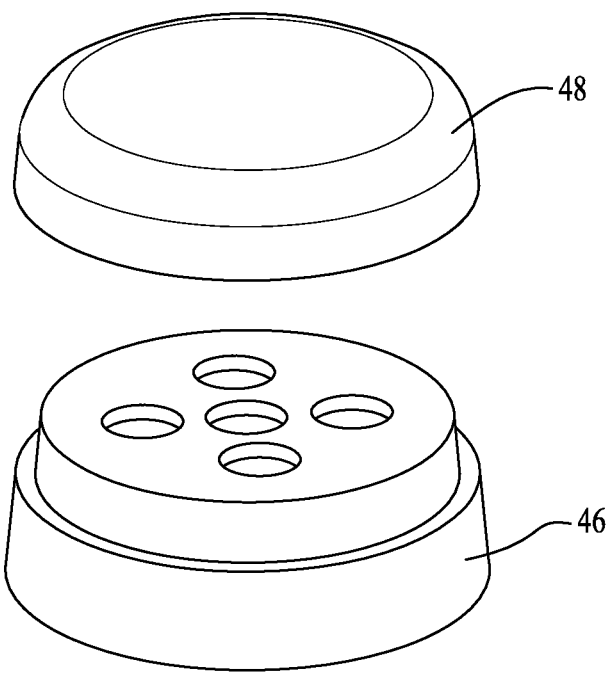
FIG. 11 is an exploded perspective view of the part illustrated in FIG. 10.

FIGS. 12-22 illustrate a sequence of steps for the preparation of a part 32 by a second embodiment of the method of the invention. As illustrated in FIGS. 10 and 11, the part 32 has two components, a lid 46 and a cap 48.

Figure 12:
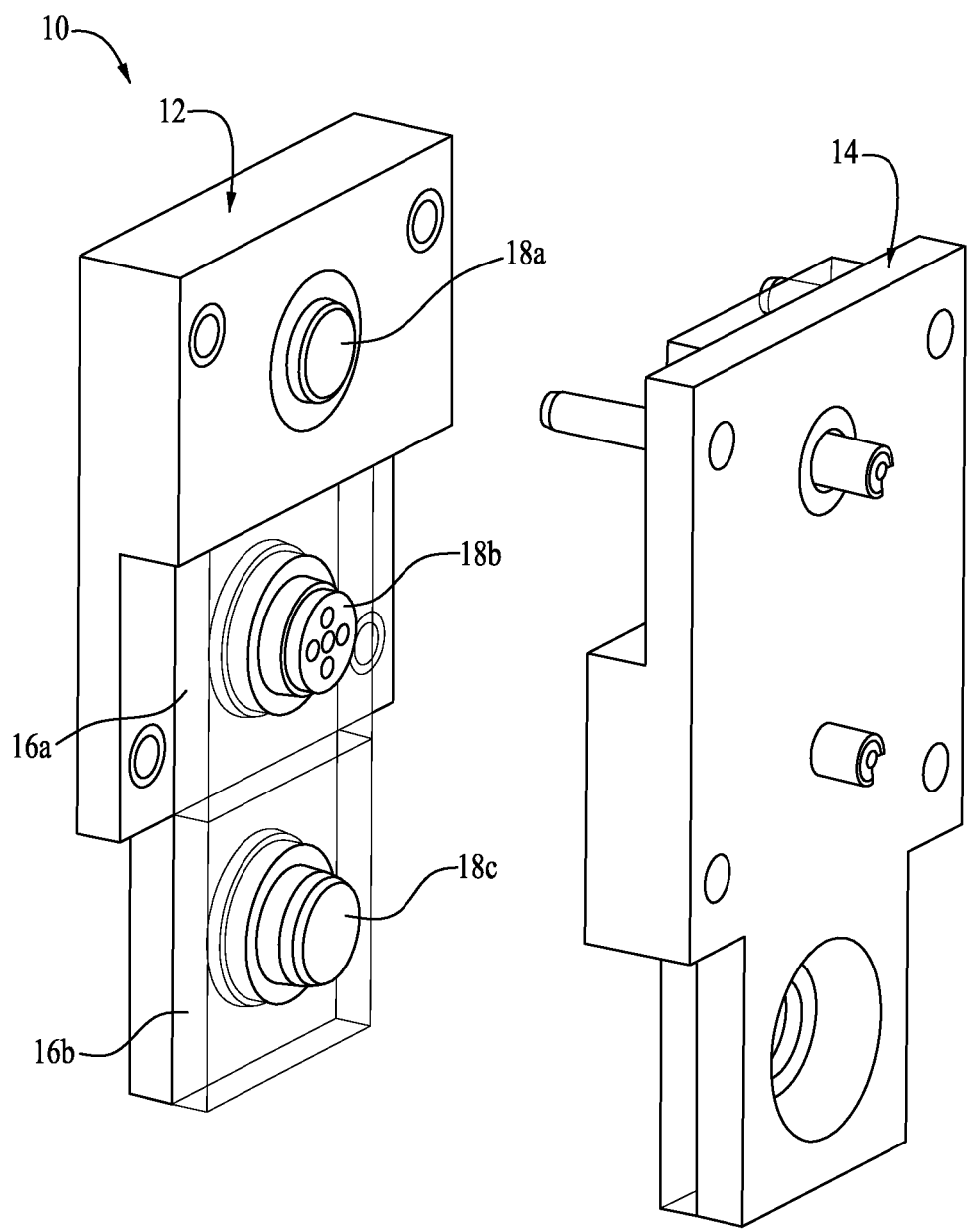
FIG. 12 is a first perspective view of a mold core side and cavity side useful in the preparation of the part illustrated in FIG. 10.

FIG. 12 illustrates a mold 10 used in this second embodiment. The mold 10 comprises a core side 12 and a cavity side 14. FIG. 12 shows the front side of the core side 12 and the rear side of the cavity side 14. The mold 10 is shown in the open mold position. The core side 12 has a first core side mold station portion 18a, a second core side mold station portion 18b and a third core side mold station portion 18c.

In FIG. 12, a first cold half stripper plate transfer mechanism 16a is shown disposed at the second core side mold station portion 18b and a second cold half stripper plate transfer mechanism 16b is shown disposed at the third core side mold station portion 18c.

Figure 13:
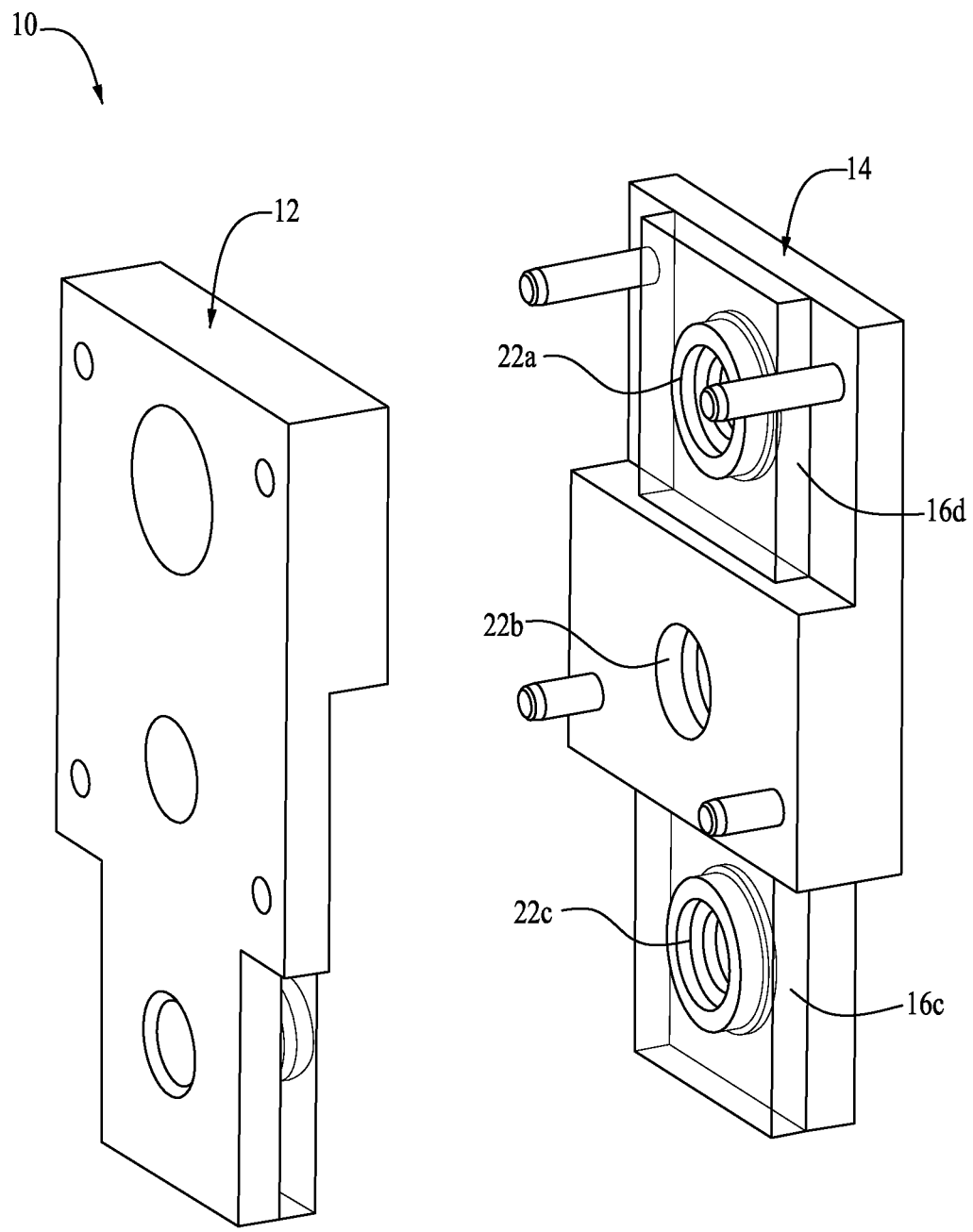
FIG. 13 is a second perspective view of a mold core side and cavity side useful in the preparation of the part illustrated in FIG. 10.

FIG. 13 also illustrates the core side 12 and the cavity side 14 illustrated in FIG. 12. FIG. 13 shows the rear side of the core side 12 and the forward side of the cavity side 14. The cavity side 14 has a first cavity side mold station portion 22a, a second cavity side mold station portion 22b and a third cavity side mold station portion 22c. A first hot half stripper plate transfer mechanism 16c is shown disposed at the third cavity side mold station portion 22c and a second hot half stripper plate transfer mechanism 16d is shown disposed at the first cavity side mold station portion 22a.

Figure 14:
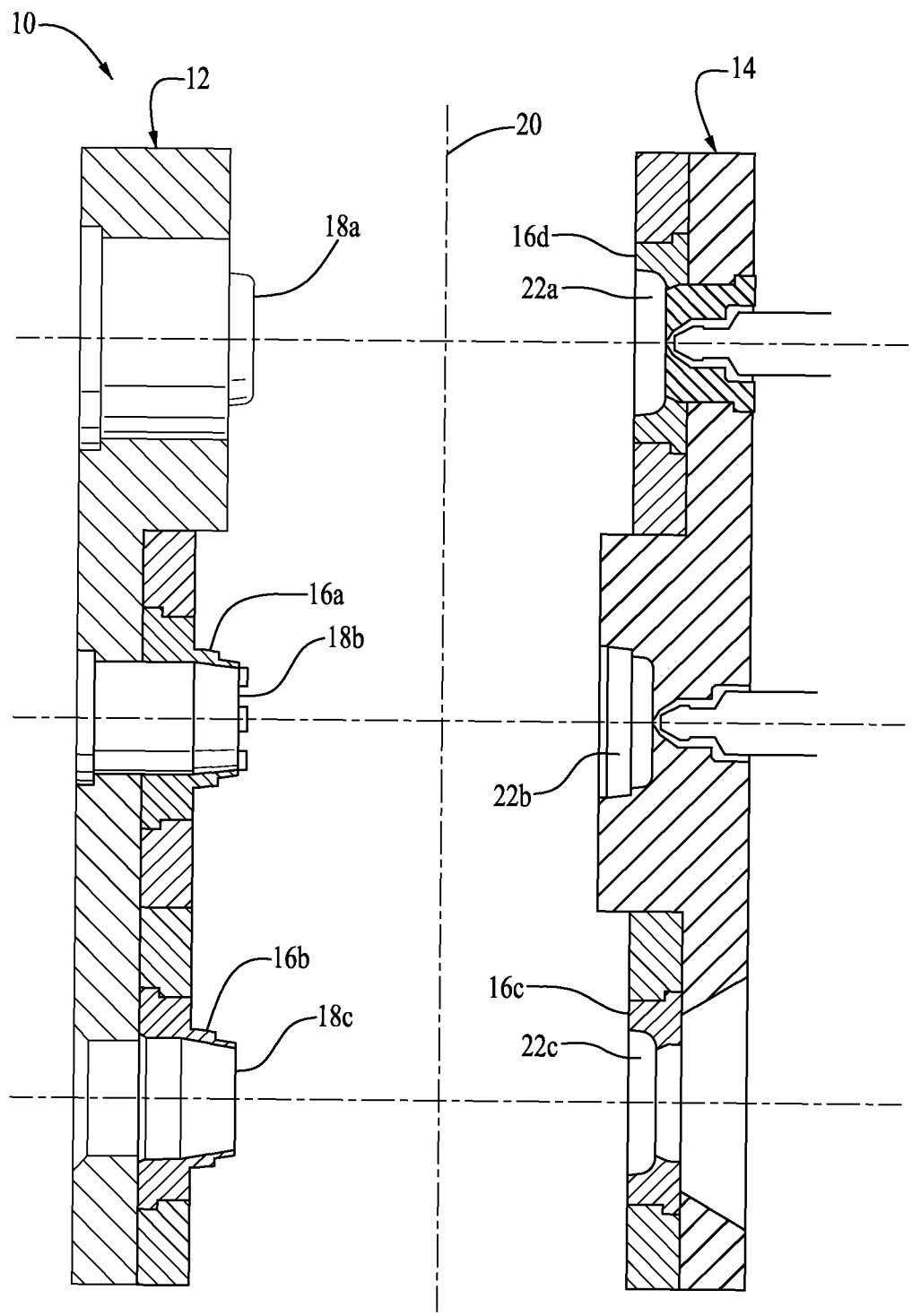
FIGS. 14-22 illustrate a sequence of steps for the preparation of the part illustrated in FIG. 10 by a second embodiment of a method having features of the invention.

FIG. 14 illustrates the initial step in the sequence of this second embodiment. FIG. 14 is a cross-sectional side view of the core side 12 when the mold 10 is in the open mold position. The core side 12 and the cavity side 14 are disposed on opposite sides of a central plane 20.

Figure 15:
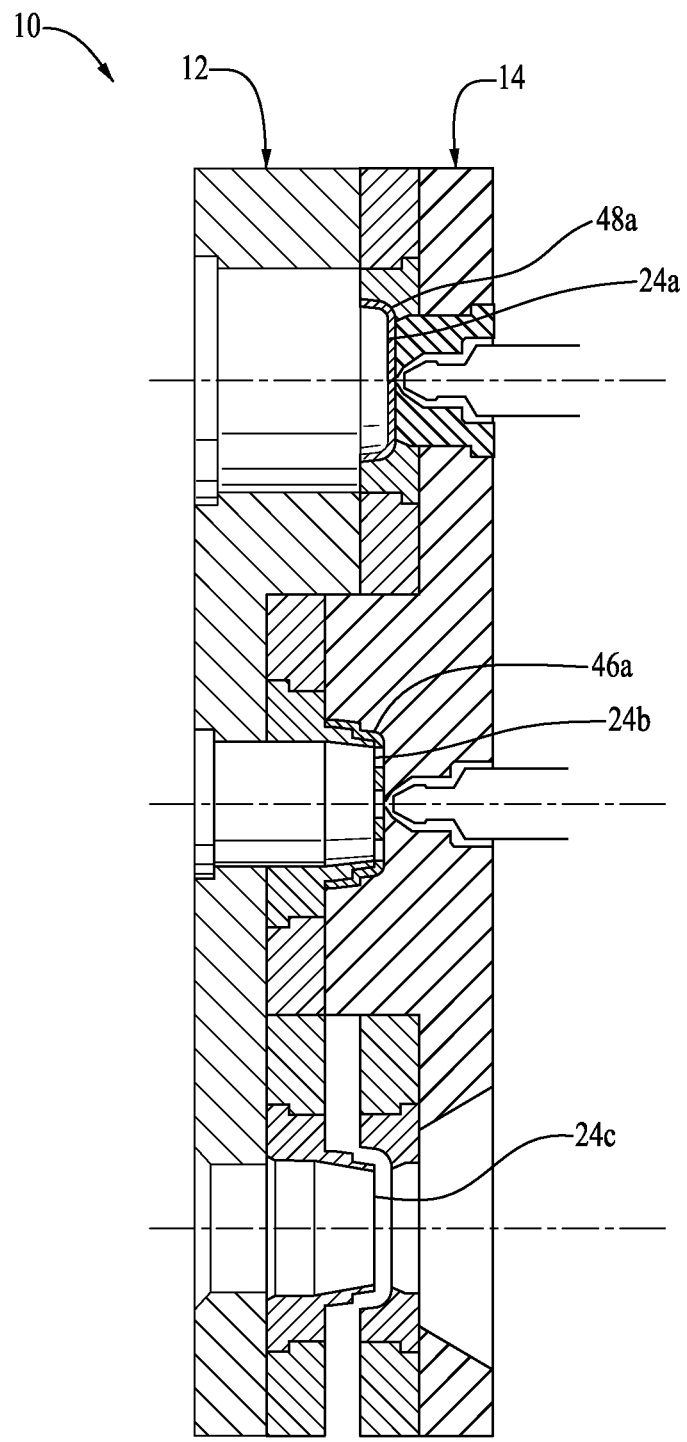

FIG. 15 illustrates the next step in the sequence, wherein the mold is placed in the closed mold position. A first mold station 24a, a second mold station 24b and a third mold station 24c are thereby formed. The first mold station 24a is formed at the top of the mold 10, the second mold station 24b is formed in the center of the mold 10 and the third mold station 24c is formed at the bottom of the mold 10.

FIG. 15 further illustrates a first material injected into the first mold station 24a to form an initially-formed cap 48a and a second material is injected into the second mold station 24b to form an initially-formed lid 46a. Because FIG. 15 illustrates the sequence near its beginning, the third mold station 24c is empty.

Figure 16:
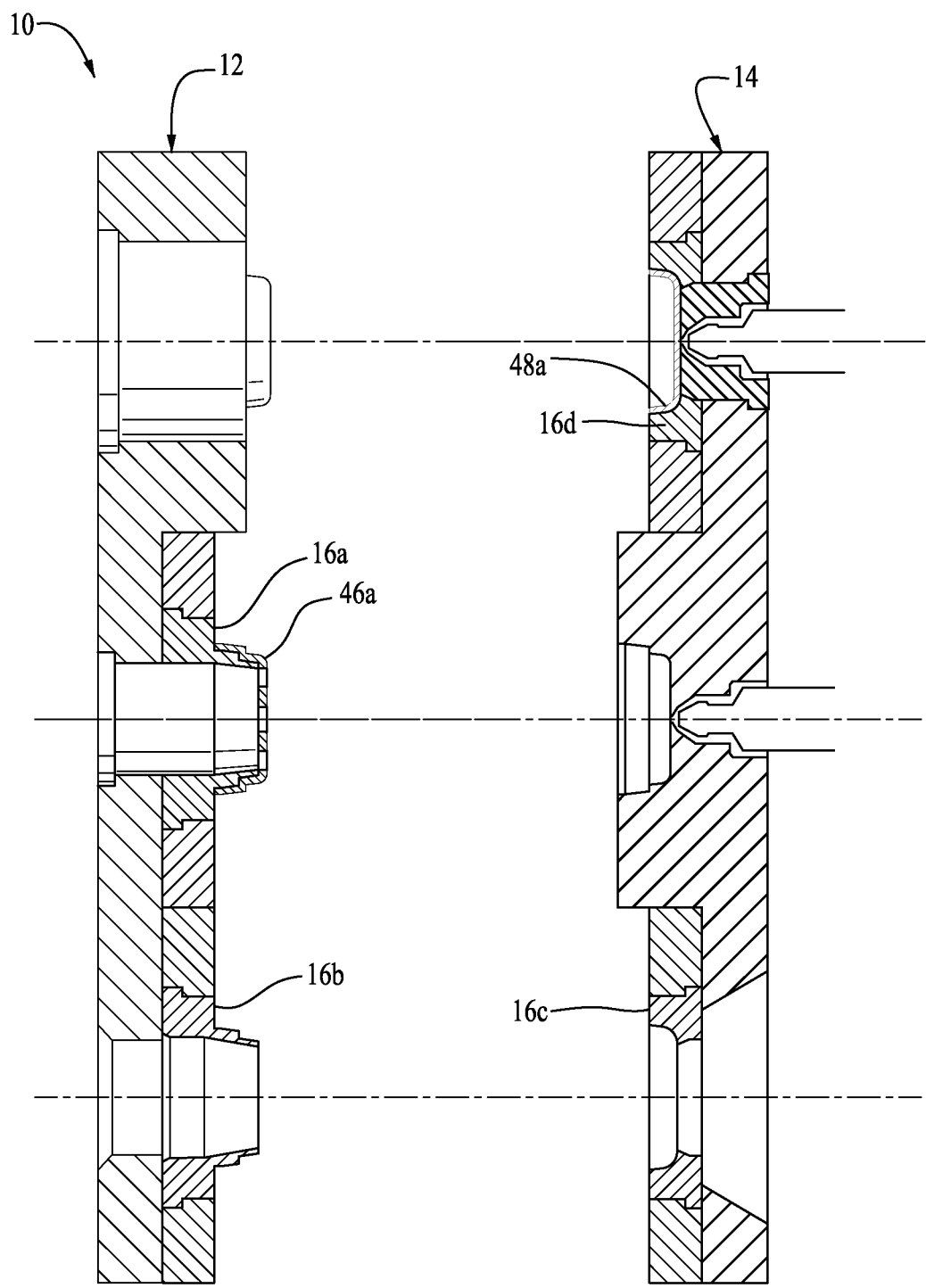

FIG. 16 illustrates the next step in the sequence, wherein the mold 10 is placed in the open mold position. The initially-formed lid 46a is retained on the first cold half stripper plate transfer mechanism 16a and the initially-formed cap 48a is retained on the second hot half stripper plate transfer mechanism 16d.

Figure 17:
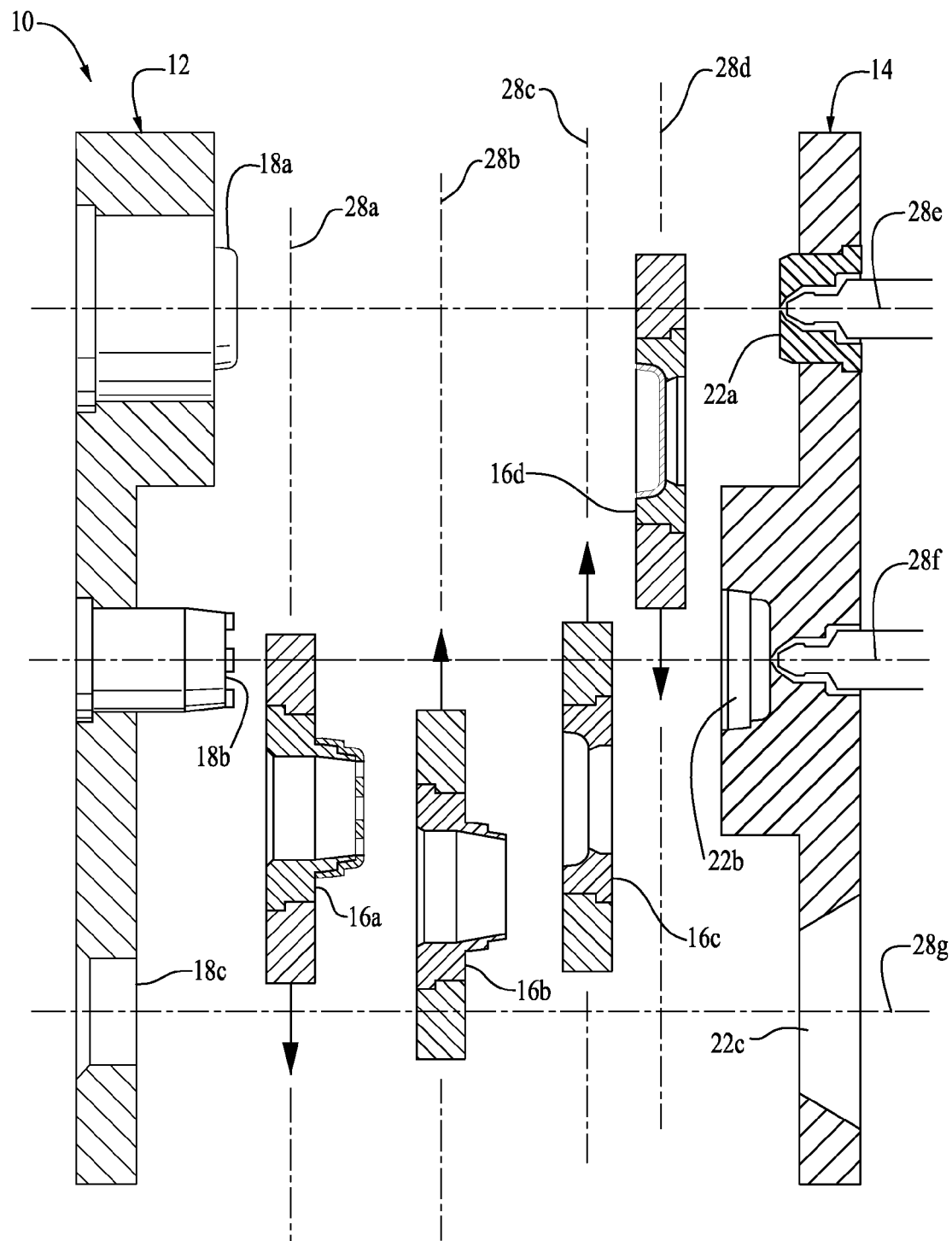

FIG. 17 illustrates the next step in the sequence, wherein the first cold half stripper plate transfer mechanism 16a is moved downwardly along a first parallel transfer mechanism plane 28a and carries the initially-formed lid 46a towards the third core side mold station portion 18c, the (empty) second cold half stripper plate transfer mechanism 16b moves upwardly in a second parallel transfer mechanism plane 28b towards the second core side mold station portion 18b, the (empty) first hot half stripper plate transfer mechanism 16c moves upwardly in a third parallel transfer mechanism plane 28c towards the first cavity side mold station portion 18a and the second hot half stripper plate transfer mechanism 16d moves downwardly in a fourth parallel transfer mechanism plane 28d and carries the initially-formed lid 46a towards the third cavity side mold station portion 22c. FIG. 17 also illustrates a first lateral transfer mechanism plane 28e, a second lateral transfer mechanism plane 28f and a third lateral transfer mechanism plane 28g. All four of the transfer mechanisms 16a-16d travel periodically along one of the three lateral transfer mechanism planes 28e-28g to reach one of the mold station portions 18a, 18b, 18c, 22a, 22b or 22c.

Figure 18:
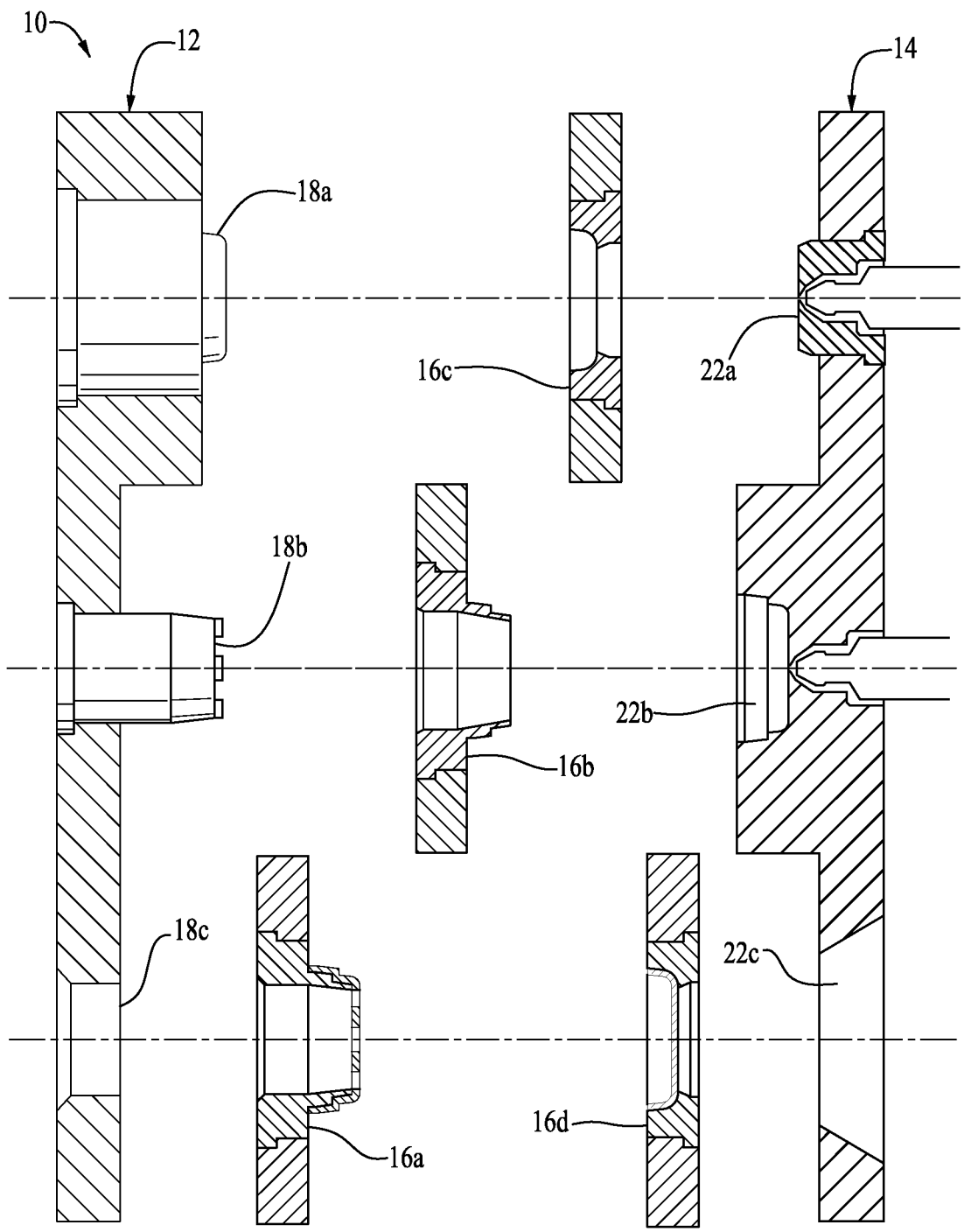

FIG. 18 illustrates the next step in the sequence, wherein the first cold half stripper plate transfer mechanism 16a is disposed opposite the third core side mold station portion 18c and opposite the third cavity side mold station portion 22c, the second cold half stripper plate transfer mechanism 16b is disposed opposite the second core side mold station portion 18b and opposite the second cavity side mold station portion 22b, the first hot half stripper plate transfer mechanism 16c is disposed opposite the first core side mold station portion 18a and opposite the first cavity side mold station portion 22a and the second hot half stripper plate transfer mechanism 16d is disposed opposite the third core side mold station portion 18c and the third cavity side mold station portion 22c.

Figure 19:
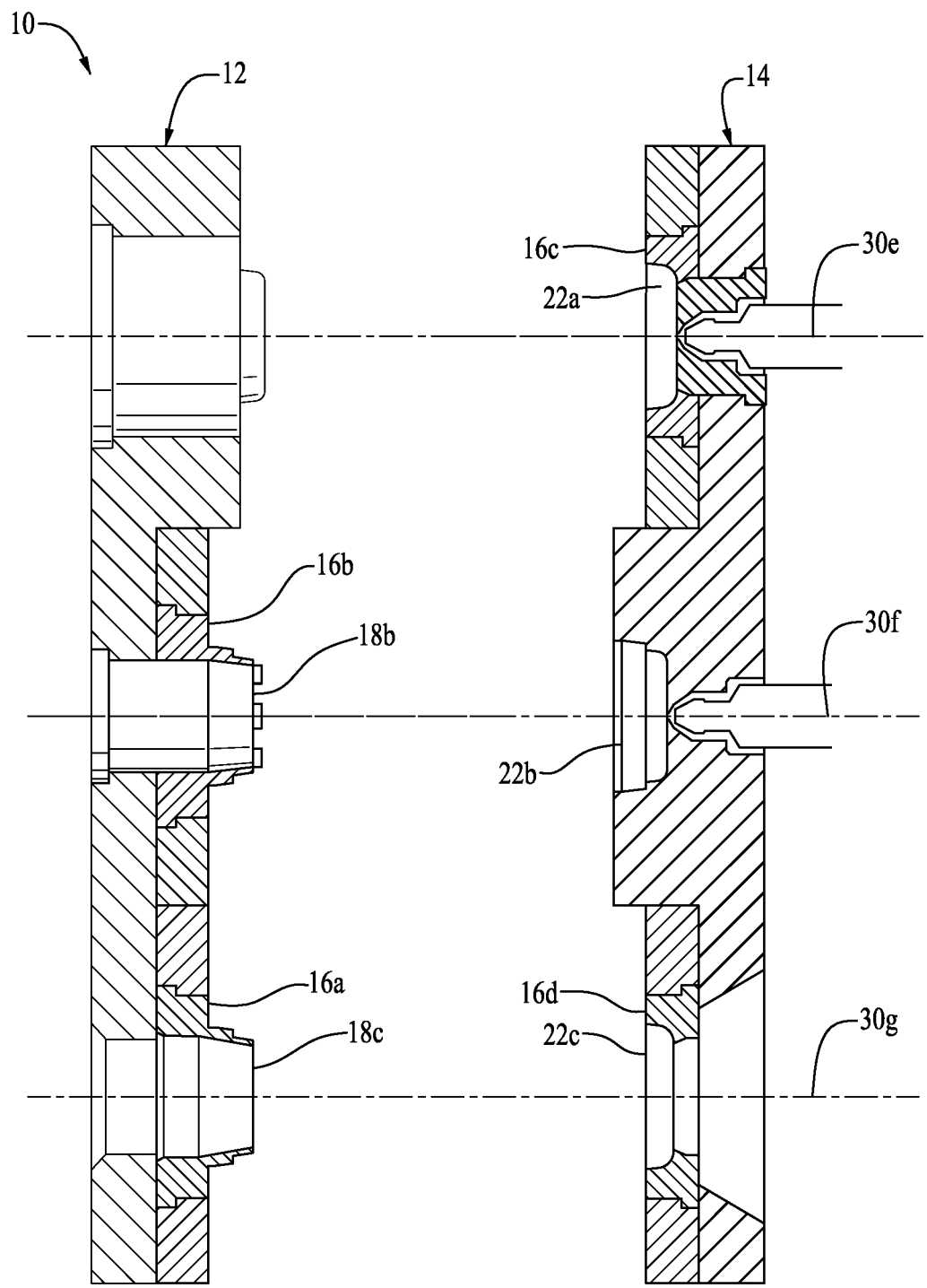

FIG. 19 illustrates the next step in the sequence, wherein the first cold half stripper plate transfer mechanism 16a is moved along the third perpendicular transfer mechanism plane 30g to the third core side mold station portion 18c, the second cold half stripper plate transfer mechanism 16b is moved along the second perpendicular lateral transfer mechanism plane 30f to the second core side mold station portion 18b, the first hot half stripper plate transfer mechanism 16c is moved along the first perpendicular transfer mechanism plane 30e to the first cavity side mold station portion 22a and the second hot half stripper plate transfer mechanism 16d is moved along the third perpendicular transfer mechanism plane 30g to the third cavity side mold station portion 22c.

Figure 20:
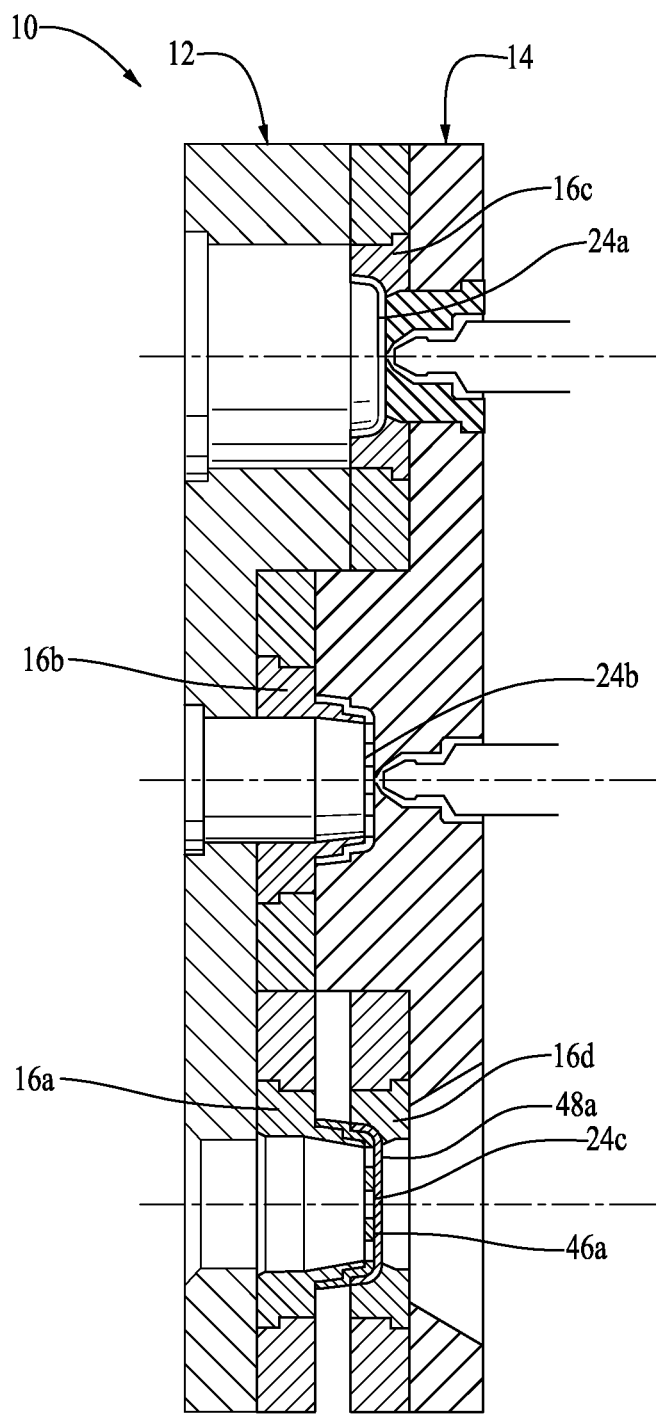

FIG. 20 illustrates the next step in the sequence, wherein the mold 10 is placed in the closed mold position. The second hot half stripper plate transfer mechanism 16d and the first cold half stripper plate transfer mechanism 16c have been moved to the third mold station 24c, thereby placing the initially-formed cap 48a over the initially-formed lid 46a. The empty first hot half stripper plate transfer mechanism 16c is disposed in the first mold station 24a, and the second cold half stripper plate transfer mechanism 16b is disposed in the second mold station 24b.

Figure 21:
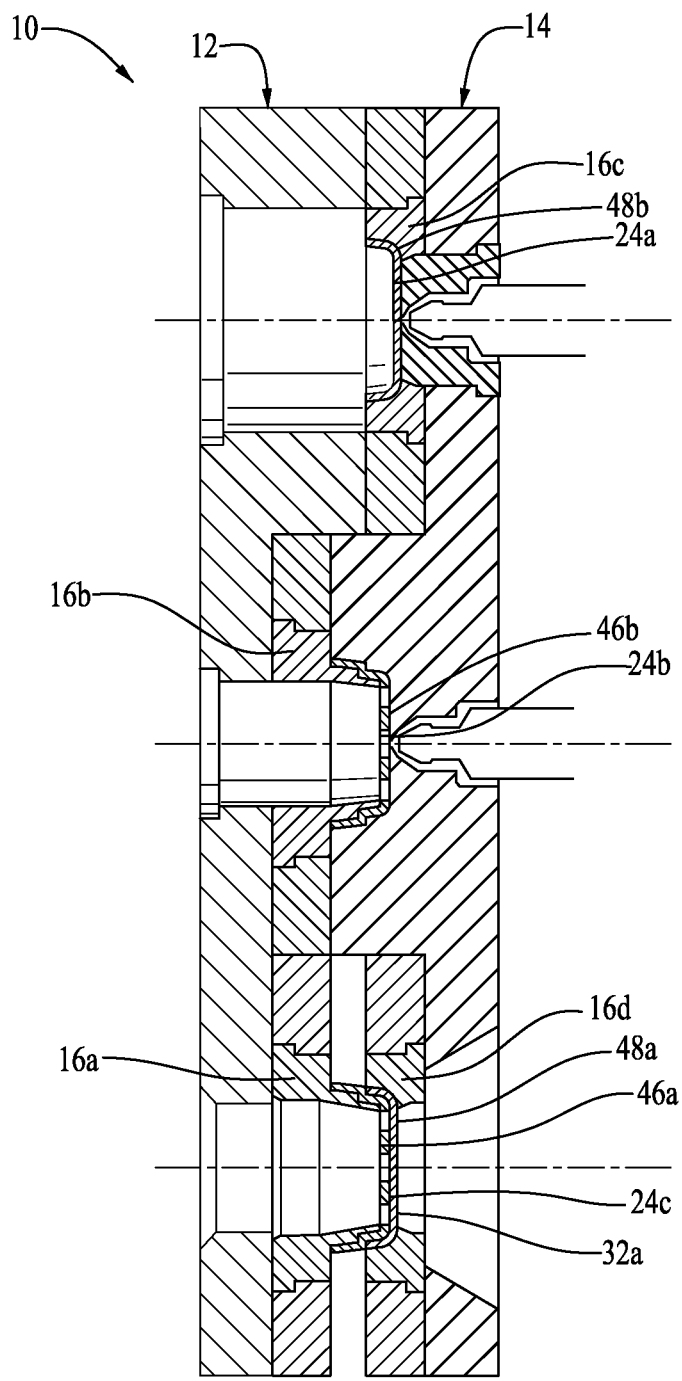

FIG. 21 illustrates the next step in the sequence, wherein a second-formed cap 48b is formed in the first mold station 24a, a second-formed lid 46b is formed in the second mold station 24b and the combination of the initially-formed cap 48a and initially-formed lid 46a is shown in the third mold station 24c. In the third mold station 24c, a label is applied to the initially-formed lid 46a to complete an initially-formed finished part 32a.

Figure 22:
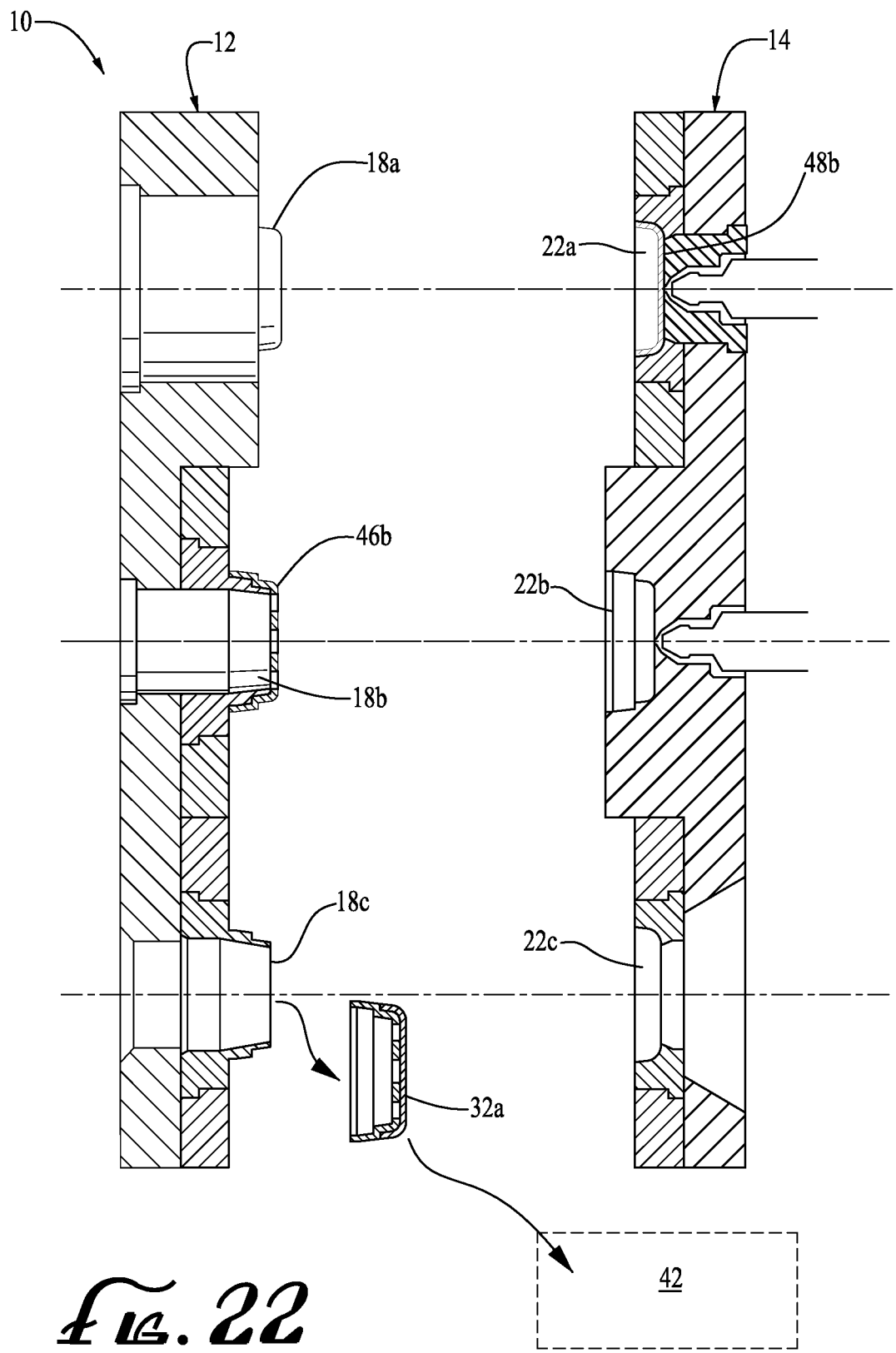

FIG. 22 illustrates the final step in one cycle of the sequence, wherein the mold 10 has been placed in the open mold position. The second-formed cap 48b is shown disposed within the first cavity side mold station portion 22a. The second-formed lid 46b is shown disposed in the second core side mold station part 18b. The initially-formed finished part 32a is shown ejected from the third cavity side mold station portion 22c for transfer to a finished part holding area 42.

Thereafter, the process continues in repeated iterations of the steps illustrated in FIGS. 17-22. It will again be observed that, once the method of the invention is underway, no mold station sits idle at any stage of the method.

Figure 23:
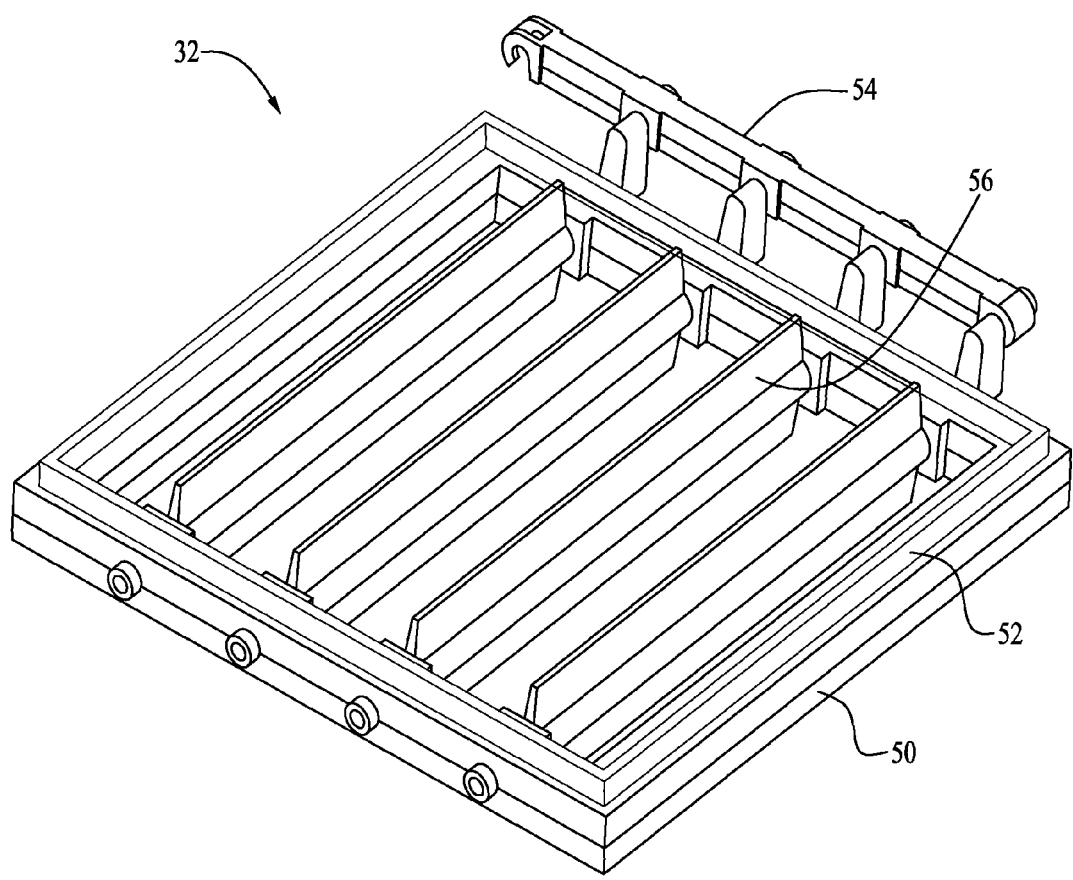
FIG. 23 is a perspective of a second part which is formed by the invention.
Figure 24:
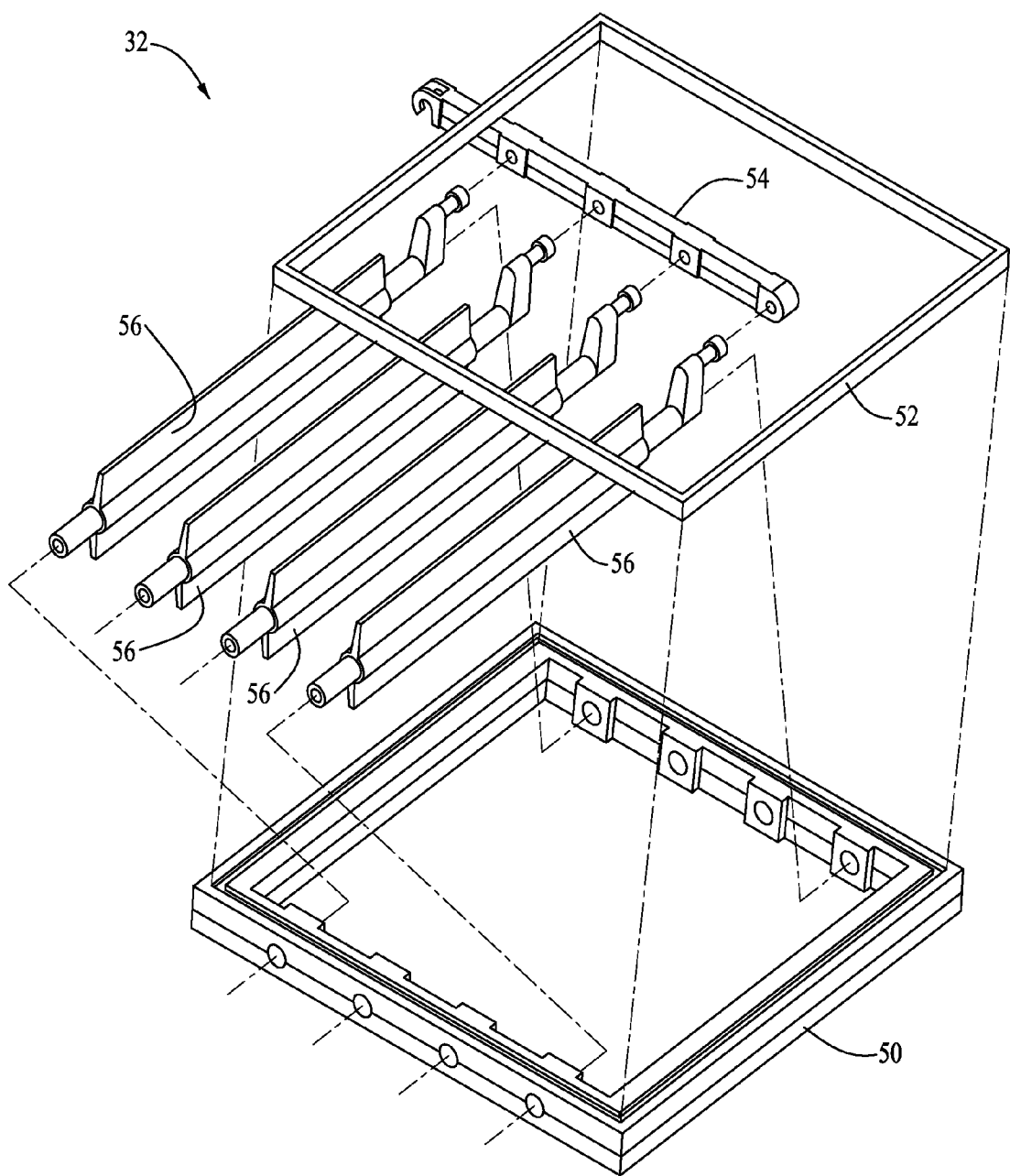
FIG. 24 is an exploded perspective view of the part illustrated in FIG. 22.

FIGS. 25-32 illustrate a sequence of steps for the preparation of the part 32 illustrated in FIGS. 23 and 24 by a third embodiment of the method of the invention. As illustrated in FIGS. 23 and 24, the part 32 is a louver assembly comprising a frame 50, a frame seal 52, an opening/closing lever 54 and four louvers 56. This third embodiment employs three mold stations: a first mold station for making the louvers 56, a second mold station for making the frames 50 and assembling the louvers 56 within the frames 50 and a third mold station for forming the frame seal 52 and the lever 54, and for attaching the frame seal 52 and the lever 54 to the frame 50 and the louvers 56 to make the completed part 32.

This third embodiment further employs a first spindle-shaped transfer mechanism 58a, a second spindle-shaped transfer mechanism 58b, a first frame-shaped transfer mechanism 58c and a second frame-shaped transfer mechanism 58d.

Figure 25:
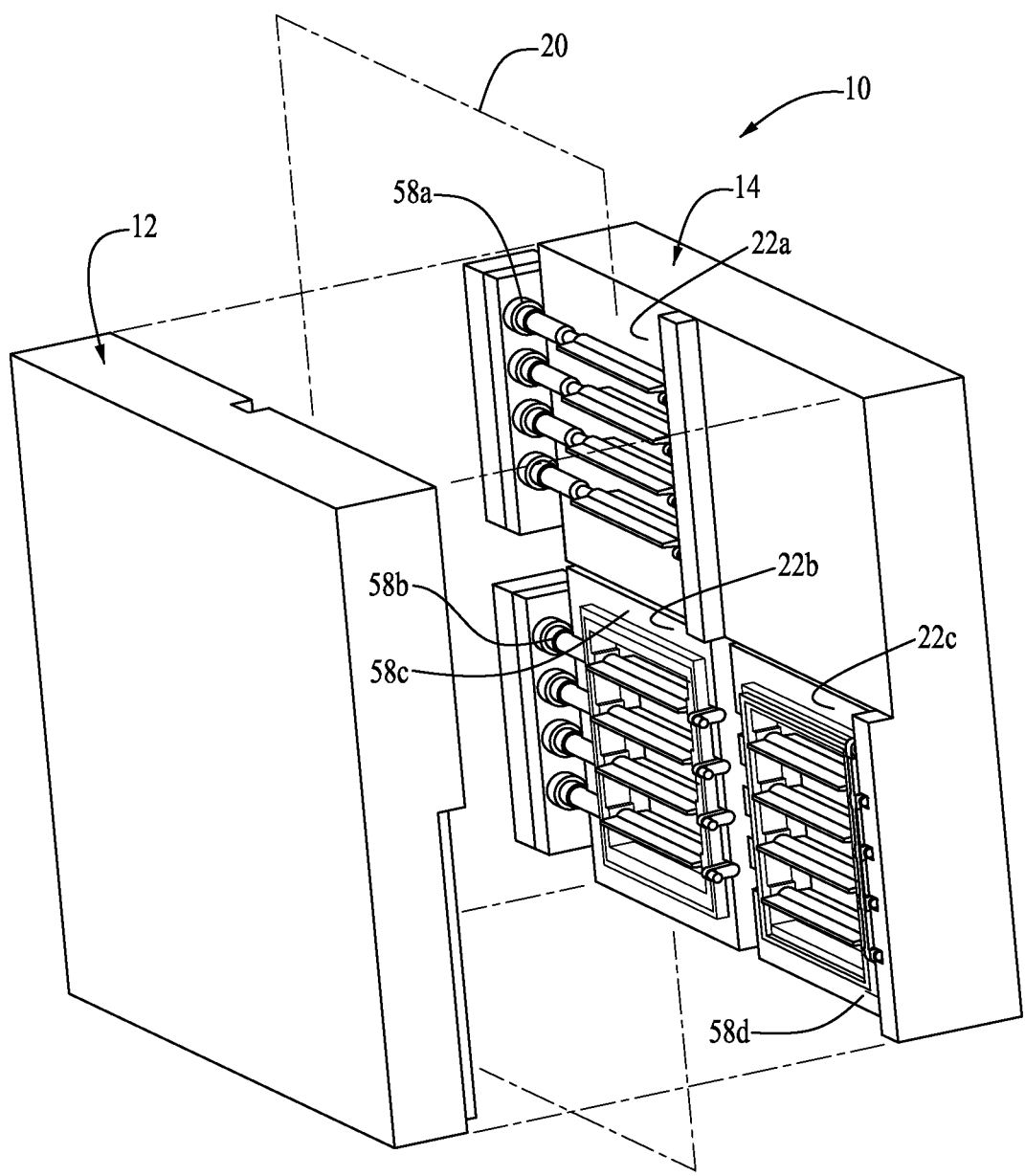

FIG. 25 illustrates a first step in the cycle, wherein the mold 10 is in the open mold position. Finished louvers 56 are shown attached to the first spindle-shaped transfer mechanism 58a in a first cavity side mold station portion 22a. Finished louvers 56 assembled within a finished frame 50 are shown disposed in a second cavity side mold station portion 22b. The finished louvers 56 within the finished frame 50 are attached to the second spindle-shaped transfer mechanism 58b, and the finished frame 50 is attached to the first frame-shaped transfer mechanism 58c. A finished product 32 is shown attached to the second frame-shaped transfer mechanism 58d within a third cavity side mold station position 22c.

Figure 26:
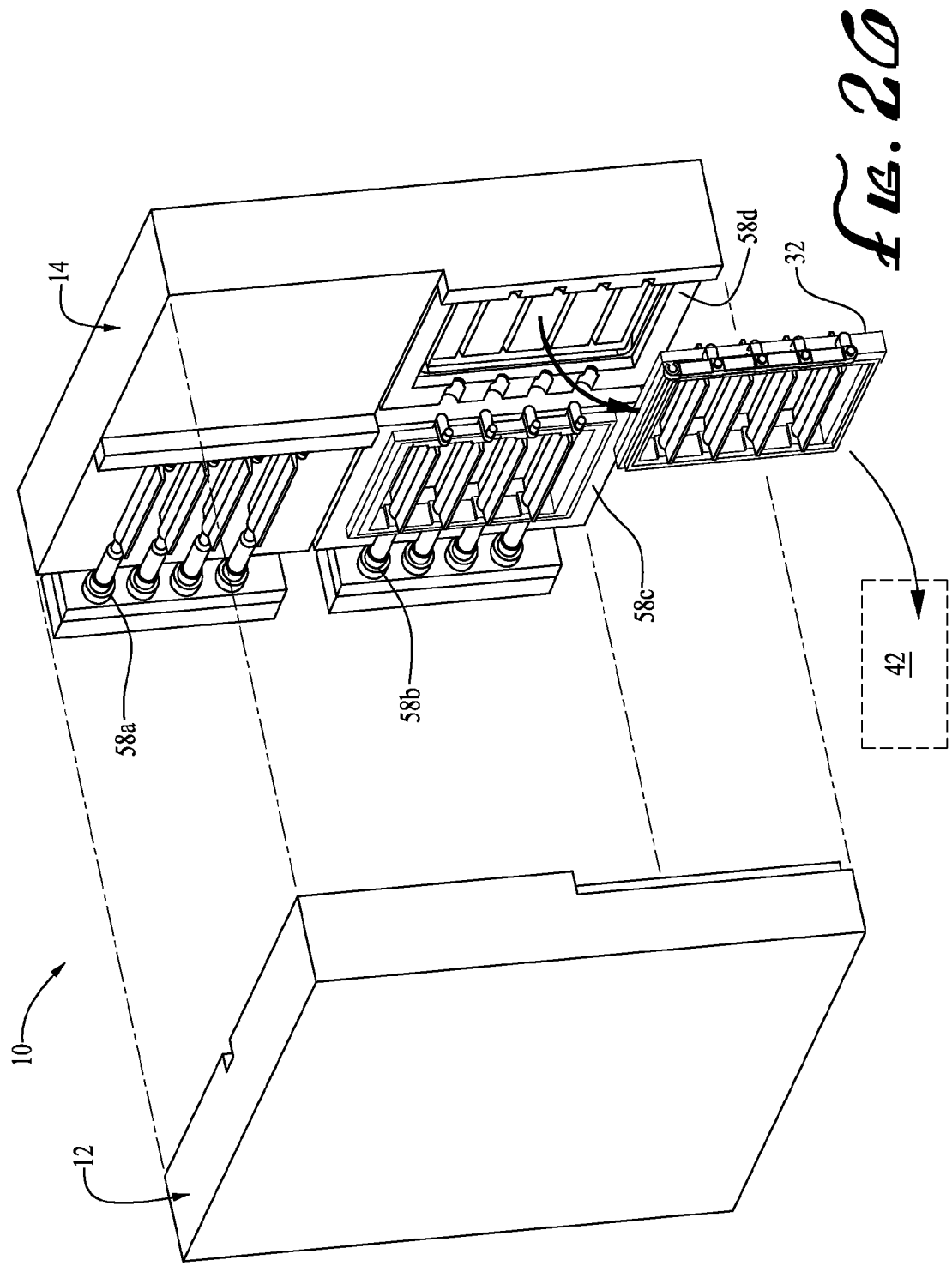

FIG. 26 illustrates the next step in the cycle, wherein the finished part 32 is removed from the second frame-shaped transfer mechanism 58d in the third cavity side mold station portion 22c for transfer to a finished part holding area 42.

Figure 27:
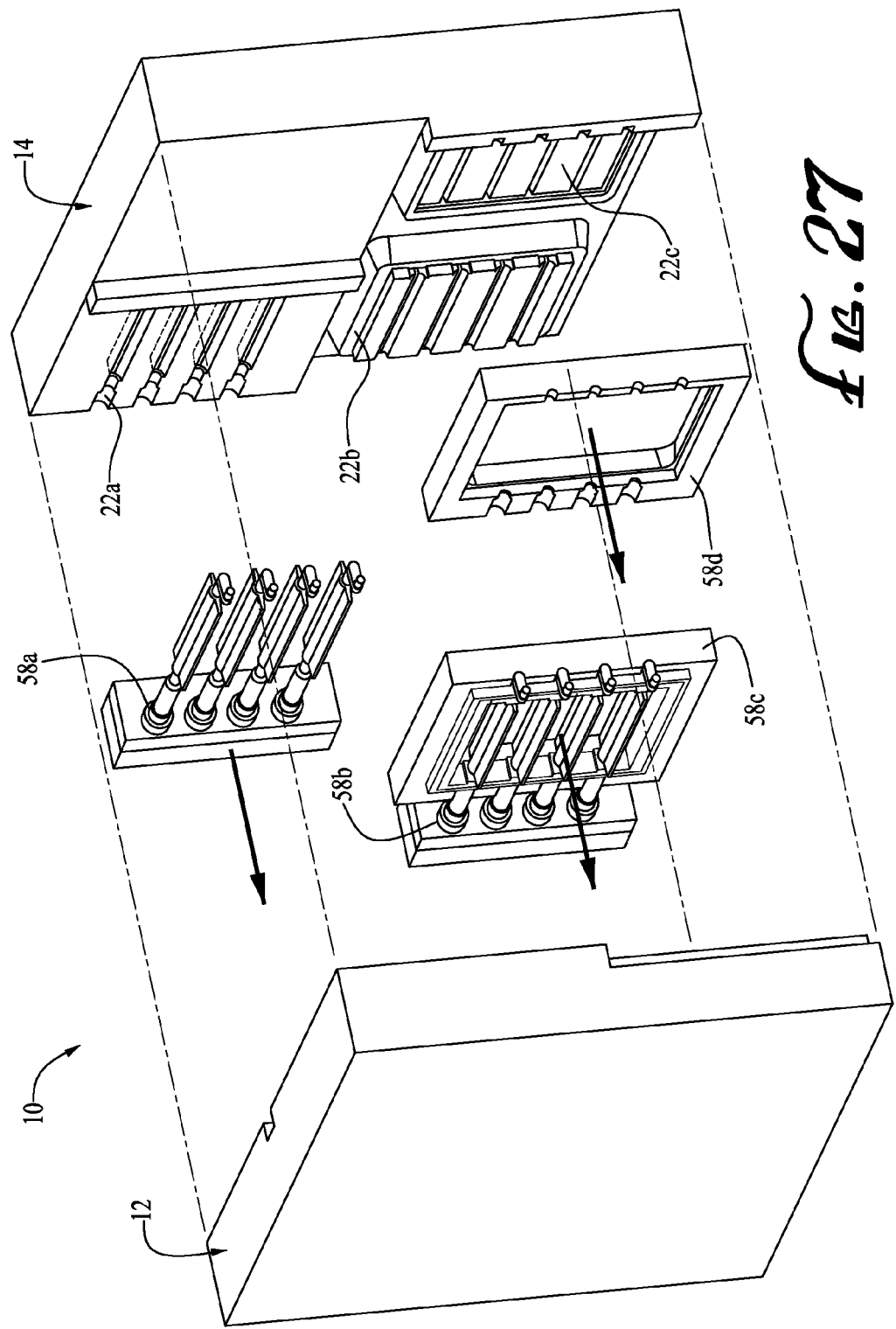

FIG. 27 illustrates the next step in the sequence. In FIG. 27, the first spindle-shaped transfer mechanism 58a is shown moving away from the first cavity side mold station portion 22a. The first frame-shaped transfer mechanism 58c and the second spindle-shaped transfer mechanism 58b are shown moved laterally away from the second cavity side mold station portion 22b. Finally, the empty second frame-shaped transfer mechanism 58d is shown moved laterally away from the third cavity side mold station portion 22c.

Figure 28:
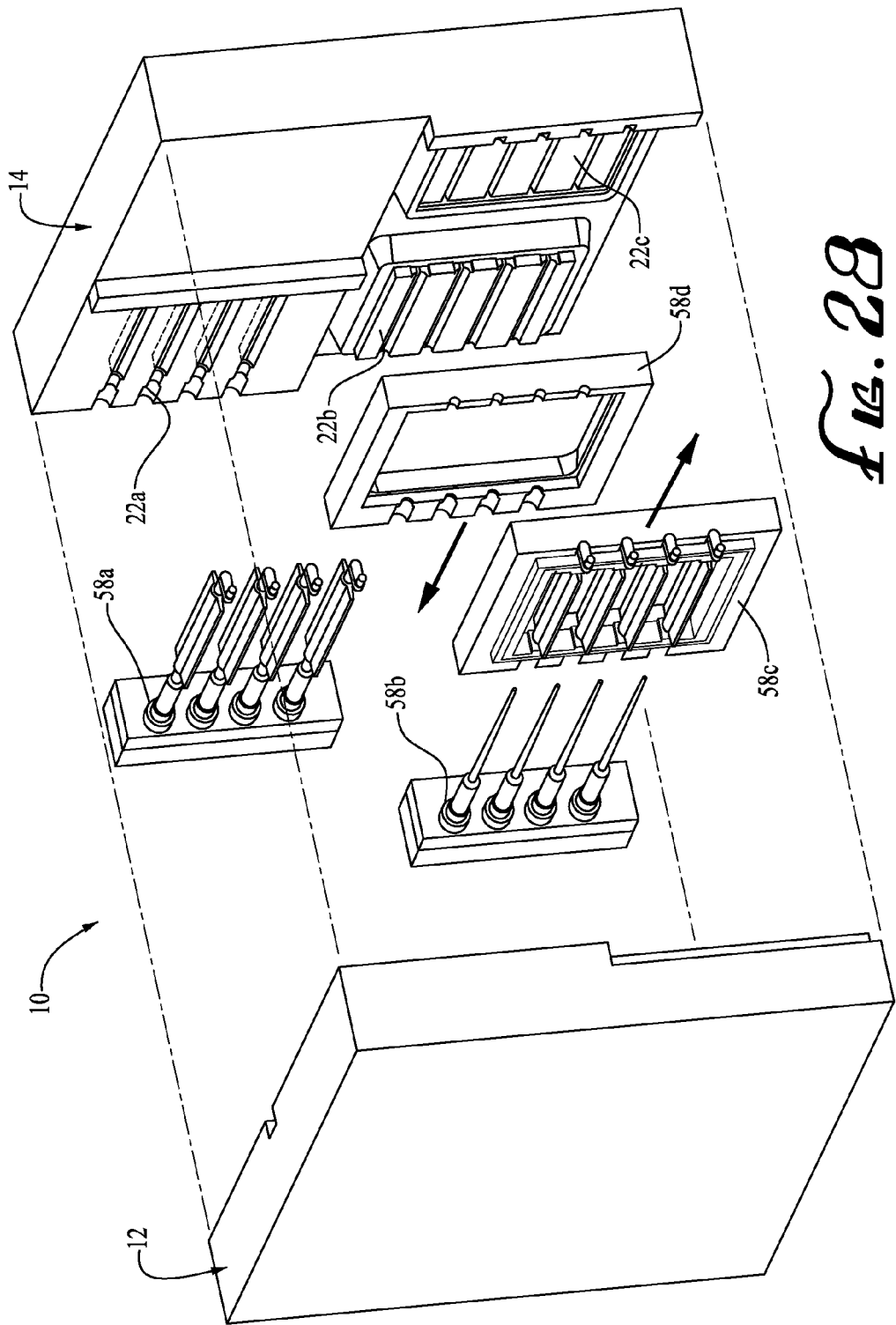

FIG. 28 illustrates the next step in the sequence. In FIG. 28, the first frame-shaped transfer mechanism 58c is shown moving away from the second spindle-shaped transfer mechanism 58b. FIG. 28 also illustrates the second frame-shaped transfer mechanism 58d moving in parallel with the central plane 20 to a position opposite the second cavity mold station portion 22b.

Figure 29:
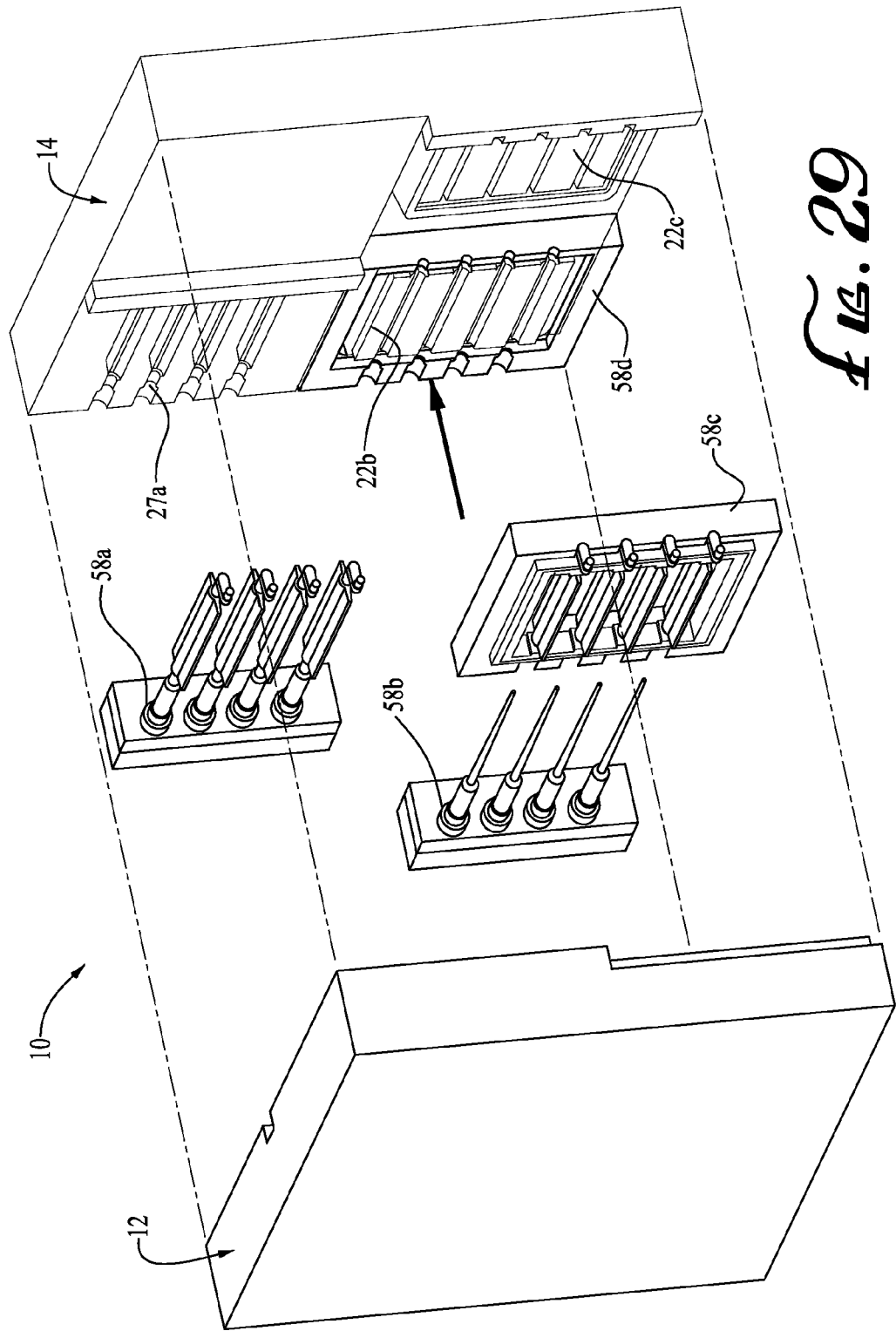

FIG. 29 illustrates the next step in the sequence. In FIG. 29, the second frame-shaped transfer mechanism 58d is shown moved away from the central plane 20 into the second cavity side mold station portion 28b. FIG. 29 also illustrates the first frame-shaped transfer mechanism 58c disposed opposite the third cavity side mold station portion 22c.

Figure 30:
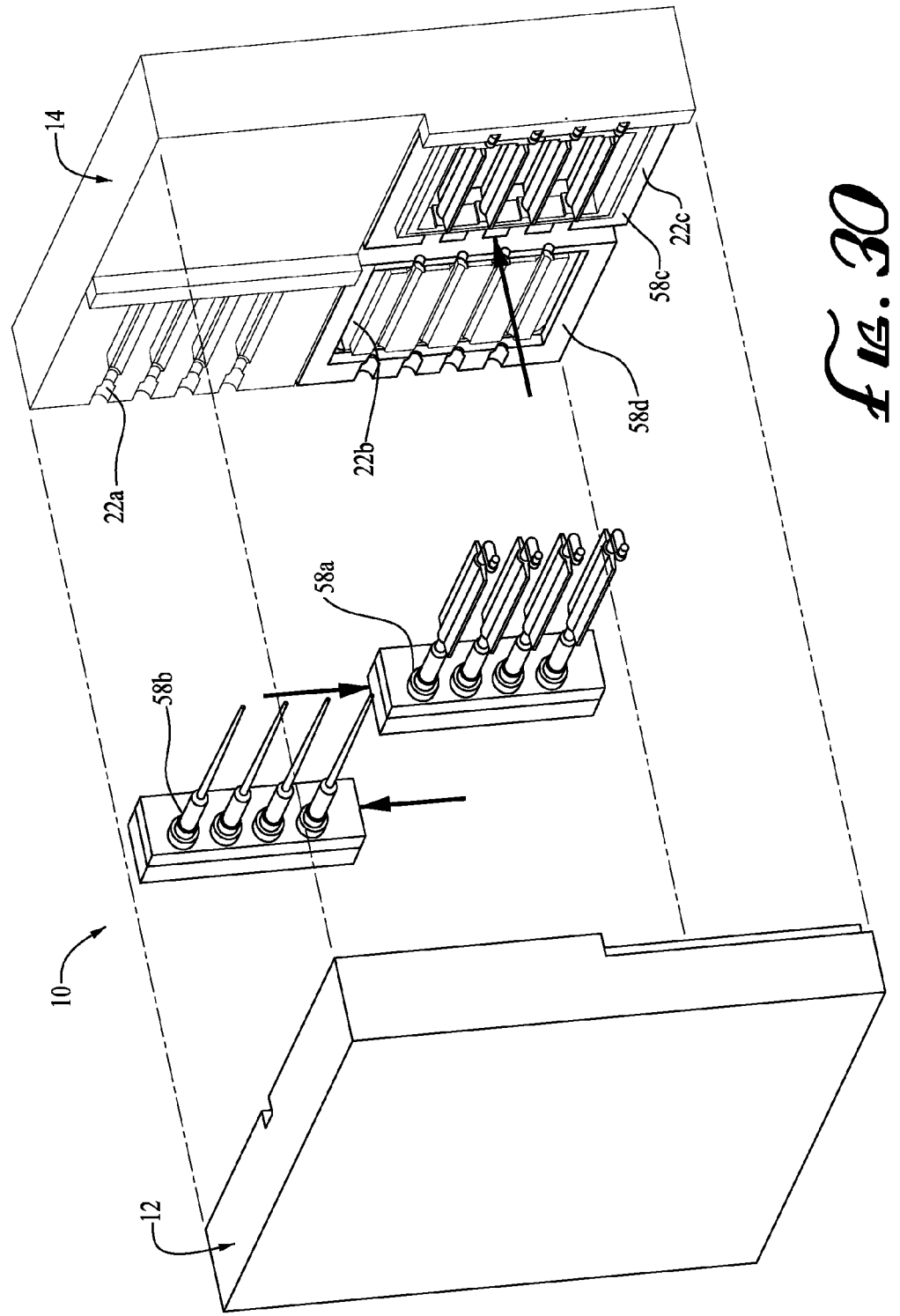

FIG. 30 illustrates the next step in the sequence. FIG. 30 illustrates the first frame-shaped transfer mechanism 58c disposed within the third cavity side mold station portion 22c and the first spindle-shaped transfer mechanism 58a aligned with and moving towards the second cavity side mold station portion 22b. FIG. 30 also illustrates the second spindle-shaped transfer mechanism 58b moving upwardly in parallel with the central plane 20 to a position opposite the first cavity side mold station portion 22a.

FIG. 31 illustrates the next step in the cycle. FIG. 31 illustrates the second spindle-shaped transfer mechanism 58b disposed within the first cavity side mold station portion 22a, the second frame-shaped transfer mechanism 58d disposed within the second cavity side mold station portion 22b and the finished louvers 56 attached to the first spindle-shaped transfer mechanism 58a disposed within the second cavity side mold station portion 22b.

FIG. 32 illustrates the closure of the mold 10 to produce the frame seal 52 and the lever 54 within the third mold station 24c and to attach the frame seal 52 and the lever 54 to the frame 50. At the same time, new louvers 56 are produced in the first mold station 24a and a new frame 50 is produced within the second mold station 24b and assembled with new louvers 56.

Thereafter, steps illustrated in FIGS. 25-32 are sequentially repeated until sufficient finished parts 32 have been produced. Once again it will be observed that, once the method is underway, no mold station sits idle at any stage of the method.

Figure 33:
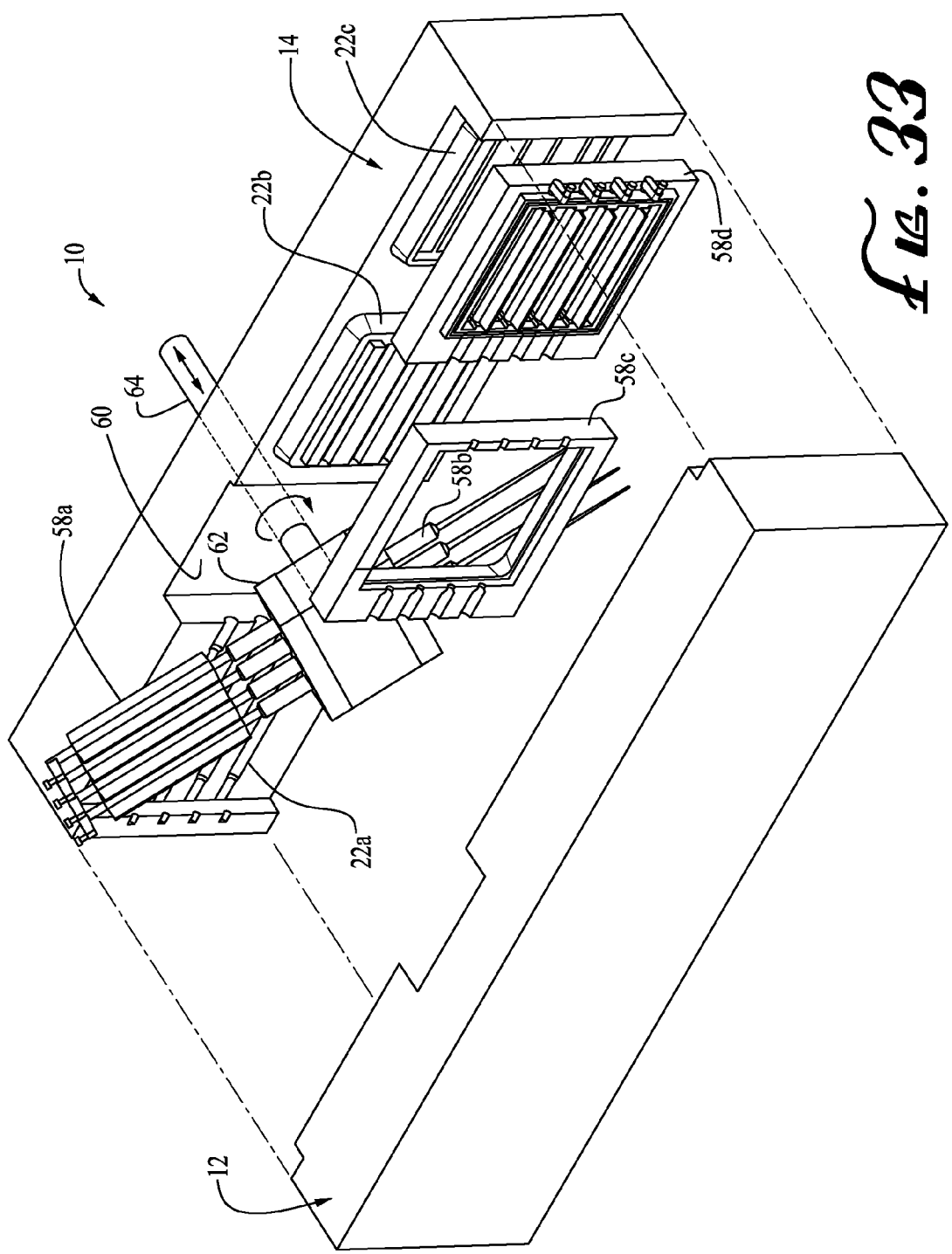

FIGS. 25-32 illustrate the preparation of the part 32 by a mold having the first cavity side mold station portion 22a disposed directly above the second cavity side mold station portion 22b and the third cavity side mold station portion 22c disposed immediately to the right of the second cavity mold station portion 22b. FIG. 33 illustrates an alternative mold for the preparation of the part 32, wherein the first cavity side mold station portion 22a is disposed to the left of the second cavity mold station portion 22b, but separated therefrom by a separation space 60.

In the embodiment illustrated in FIG. 33, the first spindle-shaped transfer mechanism 58a and the second spindle-shaped transfer mechanism 58b are disposed on opposite sides of a hub 62. The hub 62 is attached to an axle 64 which protrudes through the cavity side 14 at the separation space 60 and perpendicular to the central plane 20. The axle 64 is rotatable and axially movable to allow the hub to alternatively move closer to the cavity side 14 or further spaced apart from the cavity side 14. The hub 62 is sized and dimensioned so that the first spindle-shaped transfer mechanism 58a and the second spindle-shaped transfer mechanism 58b are alternatively aligned with and can be disposed into the first cavity mold station portion 22a and the second cavity mold station portion 22b.

In the embodiment illustrated in FIG. 33, the first frame-shaped transfer mechanism 58c and the second frame-shaped transfer mechanism 58d are disposed and operate in a fashion similar to that which is illustrated in FIGS. 25-32.

As can be seen from the foregoing, the transfer mechanisms 16 are configured to transfer each part portion 26 between different mold stations 24 along paths disposed in more than one plane.

As can be appreciated by those of skill in the art, the invention allows the transporting of product to multiple stages within the manufacturing process. Transport mechanisms move in sequence through multiple stations of process and then return to their original positions. Multiple transport mechanisms are used so that there is product at each station (i.e., no station is ever idle). This is all accomplished by mechanisms typically traveling in different planes or rotating in a way that they do not interfere with one another. Transport mechanisms can be arranged in multiple directions or multiple rotations. This allows the mechanisms to move product in multiple directions or to rotate parts.

The invention provides a mold having a much smaller footprint than complex molding systems of the prior art. The invention allows both the cavity sides and the core sides of the mold to reverse positions as the product changes position. The invention can be used to transfer parts on cores. The invention allows for parts to be cooled at stages within the process. The invention allows for parts to be stamped or labeled within the manufacturing process. The invention allows for the assembly of complex parts made up of multiple part components.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A method for preparing a finished part in a mold wherein the finished part includes n mold inputs, the method comprising the steps of:

(a) providing a single mold having n mold stations;
(b) simultaneously adding a mold input at each mold station to create a finished part and n−1 part portions, the mold inputs comprising at least two material additions, each material addition being added at a separate mold station;
(c) removing the finished part and each part portion from each mold station;
(d) transferring the finished part to a finished part holding area and transferring each part portion to a different mold station; and
(e) repeating steps (b) through (d);
wherein the step of transferring the finished part to a finished part holding area and transferring each part portion to a different mold station is accomplished such that, during steps in (b)-(e) each part portion is transferred between different mold stations along paths disposed in more than one plane;
wherein the step of transferring the finished part to a finished part holding area and transferring each part portion to a different mold station is accomplished by one or more transfer mechanisms comprising at least two transfer mechanisms which move in linear paths parallel to one another.

2. The method of claim 1 wherein the step of transferring the finished part to a finished part holding area and transferring each part portion to a different mold station is accomplished by one or more transfer mechanisms traveling along linear or rotary paths.

3. The method of claim 1 wherein the step of transferring the finished part to a finished part holding area and transferring each part portion to a different mold station is accomplished by one or more transfer mechanisms traveling along a plurality of linear paths.

* * * * *